(12) United States Patent
Hashimoto et al.

(10) Patent No.: US 7,532,270 B2
(45) Date of Patent: *May 12, 2009

(54) MANUFACTURING METHOD OF A LIQUID CRYSTAL DISPLAY DEVICE USING A PHOTO RESIST HAVING REGIONS WITH DIFFERENT THICKNESSES, ASHING, AND REFLOW PROCESSING

(75) Inventors: Yoshiaki Hashimoto, Tokyo (JP); Hiroaki Tanaka, Tokyo (JP); Shigeru Kimura, Tokyo (JP); Syuusaku Kido, Izumi (JP)

(73) Assignee: NEC LCD Technologies, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/020,390

(22) Filed: Jan. 25, 2008

(65) Prior Publication Data
US 2008/0124825 A1 May 29, 2008

Related U.S. Application Data

(62) Division of application No. 10/127,929, filed on Apr. 23, 2002, now abandoned.

(30) Foreign Application Priority Data
Apr. 26, 2001 (JP) ............................. 2001-130421

(51) Int. Cl.
G02F 1/136 (2006.01)
G02F 1/1343 (2006.01)
(52) U.S. Cl. .................... 349/43; 349/141; 349/187; 257/59; 438/30; 438/159
(58) Field of Classification Search .................. None
See application file for complete search history.

(56) References Cited

U.S. PATENT DOCUMENTS

| 5,361,153 | A | 11/1994 | Shimamune et al. |
| 5,995,191 | A | 11/1999 | Tamai et al. |
| 6,208,399 | B1* | 3/2001 | Ohta et al. .................. 349/139 |
| 6,287,899 | B1* | 9/2001 | Park et al. .................... 438/149 |
| 6,493,048 | B1* | 12/2002 | Baek et al. ..................... 349/43 |
| 6,686,229 | B2* | 2/2004 | Deane et al. ................. 438/151 |
| 7,041,522 | B2* | 5/2006 | Tanaka et al. ................. 438/30 |
| 2001/0048491 | A1* | 12/2001 | Tanaka et al. ................. 349/44 |

FOREIGN PATENT DOCUMENTS

| JP | 10-186407 | 7/1998 |
| KR | 1999-012990 | 2/1999 |
| KR | 2000-0073730 | 12/2000 |

* cited by examiner

Primary Examiner—Andrew Schechter
(74) Attorney, Agent, or Firm—Hayes Soloway P.C.

(57) ABSTRACT

A method for manufacturing a liquid crystal display that provides a wide viewing angle and in which its manufacturing processes are shortened and high reliability is provided. The method includes the steps of forming a gate electrode metal layer and forming a gate electrode by patterning using photolithography; forming an interlayer insulating film, an a-Si layer, an $n^+$ a-Si layer, and a drain electrode metal layer and forming a drain line and an island by performing patterning, ashing processing, reflow processing using photolithography, and peeling; forming an insulating film on a transparent insulating substrate and forming an insulating film contact used to provide a connection to a source electrode of an island at a specified position by patterning or a printing method; forming a transparent conductive film and forming a pixel electrode and common electrode by patterning using photolithography.

11 Claims, 26 Drawing Sheets

MANUFACTURING METHOD OF A LIQUID CRYSTAL DISPLAY DEVICE USING A PHOTO RESIST HAVING REGIONS WITH DIFFERENT THICKNESSES, ASHING, AND REFLOW PROCESSING

CROSS REFERENCE TO RELATED APPLICATION

This application is a divisional of U.S. application Ser. No. 10/127,929, filed Apr. 23, 2002, now abandoned.

BACKGROUND OF THE INVENTION

1. Field of the Invention

The present invention relates to a method for manufacturing a liquid crystal display (LCD) and more particularly to the method for manufacturing the LCD which enables a display with a wide viewing angle.

The present application claims priority of Japanese Patent Application No. 2001-130421 filed on Apr. 26, 2001, which is hereby incorporated by reference.

2. Description of the Related Art

For an LCD that can provide a wide viewing angle, in general, the display with a wide viewing angle is enabled by arranging a common electrode and a pixel electrode on a protecting film of a TFT (Thin Film Transistor) and by rotating a direction of a molecular axis of a liquid crystal molecule put in a liquid crystal layer in a hermetically sealed manner on a surface being parallel to a surface of an active matrix substrate. A typical example is an IPS (In-Plane Switching)-type LCD.

FIG. 20 shows schematic configurations of one pixel portion making up a conventional IPS-type LCD that can provide a wide viewing angle disclosed in Japanese Patent Application Laid-open No. Hei 10-186407. In the one pixel portion of the conventional IPS-type LCD disclosed above are provided a gate electrode 204, a drain line 206, a common electrode (ITO) (Indium Tin Oxide) 210, a common electrode 207, a pixel electrode (ITO) 211, a pixel electrode (drain layer) 213, and a TFT. In the IPS-type LCD, a display is performed by producing an electric field being substantially parallel to a surface of a substrate between the pixel electrode (ITO) 211 and the common electrode (ITO) 210 and by rotating a direction of a liquid crystal molecule within a face being parallel to the substrate surface according to the electric field. On the other hand, the TFT chiefly includes a source electrode 218, a drain electrode 215, and a semiconductor layer 219, or the like. There are provided two contact holes, one being a contact hole 217 for the common electrode (ITO) 210 and another being a contact hole 312 for the pixel electrode (ITO) 211.

FIGS. 21 to 26 are cross-sectional views showing processes 1-5 for manufacturing the conventional IPS-type LCD shown in FIG. 20. In each of FIGS. 21 to 26, a TFT element portion shows a cross-sectional view of the TFT of FIG. 20, taken along a line A—A'. A pixel portion is shown in a cross-sectional view of a part of the pixel portion of FIG. 20 taken along a line B-B'. A common electrode contact hole portion is shown in a cross-sectional view of the contact hole portion of FIG. 20 taken along a line C-C'. A gate terminal portion is shown in a cross-sectional view of a gate terminal, and a drain terminal portion is shown in a cross-sectional view of a drain terminal.

First, as shown in FIG. 21, a gate metal layer (not shown) is formed on a glass substrate by a sputtering method and the gate electrode 204 is formed using a first mask at a specified region on the gate metal layer in such a manner that a signal line for scanning (not shown) and the gate electrode 204 are integrally formed. Then, as shown in FIG. 22, an interlayer (gate) insulating film 223, an a⁻Si (amorphous silicon semi-conductor) layer 238, and an n⁺a⁻Si (high concentration n-type amorphous silicon) layer 239 are sequentially formed by deposition on an entire surface of the glass substrate. By using a second mask, an island 235 is formed above the interlayer insulating film 223. Next, as shown in FIG. 23, a drain electrode metal layer is formed on the glass substrate by a sputtering method. Then, by using a third mask, a source electrode 218, a pixel electrode 213, a drain electrode 215, and a drain line 206 are formed so that the source electrode 218 and the pixel electrode 213 are integrally configured and the drain electrode 215 and the drain line 206 are integrally configured. A hollow, as shown in FIG. 23, is formed by performing dry (plasma) etching on a channel portion. At this point, since not only the n⁺a⁻Si layer 239 (FIG. 22) but also a⁻Si layer 238 (FIG. 22) is etched to some extent, a thickness of the deposited a⁻Si layer 238 is made larger. Then, as shown in FIG. 24, a passivation film 222 and an organic insulating film 221 are stacked on the glass substrate and an organic insulating film contact hole is formed in the organic insulating film 221 by using a fourth mask so that the organic insulating film contact hole passes through the organic insulating film 221 and reaches the passivation film 222 in order to provide a connection to the source electrode 218. Next, as shown in FIG. 25, portions of the passivation film 222 and the interlayer insulating film 223 being exposed are removed by an etching method using a fifth mask to form specified contact holes. Finally, as shown in FIG. 26, an ITO film 11 is formed by a sputtering method or the like so that its thickness is about 50 nm. Then, by using a sixth mask, unwanted portions of the ITO film 11 are removed by a wet etching method to provide a connection between the source electrode 218 and the pixel electrode 211. When a common electrode 210 is formed from the ITO film, sputtering of Cr (chromium) is performed on the passivation film 222 so that a thickness of the Cr film becomes 100 nm so that the common electrode 210 satisfies conditions described above. Then, an orientation film (not shown) is formed in a manner so as to cover all of them.

However, the conventional method for manufacturing the IPS-type LCD disclosed in Japanese Patent Application Laid-open No. Hei 10-186407 is problematic because the first to sixth masks are used, and the manufacturing process of the TFT is extended.

Moreover, when a known shortened process of manufacturing a TFT is employed in the case of manufacturing the IPS-type LCD, since a patterning process is performed on a semiconductor layer and an electrode in one photo resist process, a shape of the semiconductor layer and the electrode becomes the same and therefore a step of the TFT becomes larger, which makes it difficult to exert control on orientation of a liquid crystal. Thus, an increase in a black luminance and a so-called "floating black" are caused.

Furthermore, when the shortened processes for manufacturing the TFT are used, coverage by the passivation film becomes weak, which causes electrode materials (for source and drain electrodes) to penetrate into a liquid crystal from a coverage defective portion. Thus, a progressive display failure (dot-like stain or black stain) occurs.

SUMMARY OF THE INVENTION

In view of the above, it is an object of the present invention to provide a method for manufacturing an LCD that can provide a wide viewing angle and that enables processes to be shortened and that can provide improved reliability.

According to a first aspect of the present invention, there is provided a method for manufacturing a liquid crystal display providing a wide viewing angle in which a display with a wide viewing angle is enabled by placing a common electrode and a pixel electrode on a protecting film of a thin film transistor and by rotating a direction of a molecular axis of a liquid crystal molecule making up of a liquid crystal layer in a hermetically sealed manner on a surface being parallel to a surface of an active matrix substrate, the method including:

a process of sequentially forming a gate electrode metal layer, a gate insulator, and an a⁻Si layer on a transparent insulating substrate and forming an island made up a gate electrode, a gate insulating film, and a semiconductor layer by patterning using photolithography;

a process of sequentially forming an interlayer insulating film and a drain electrode metal layer on the transparent insulating substrate and forming a drain line by removing a specified portion of the drain electrode metal layer by patterning using photolithography;

a process of forming an insulating film on the transparent insulating substrate and forming an insulating film contact which passes through the insulating film and is used to provide a connection to a source electrode and a drain electrode at a specified position by patterning using photolithography; and a process of forming a transparent conductive film on the transparent insulating substrate and forming the pixel electrode and common electrode each having a comb-teeth-like configuration by removing unwanted portions of the transparent conductive film so that the pixel electrode and the common electrode are arranged in a staggered manner by patterning using photolithography and of connecting the source electrode to the pixel electrode and connecting the drain electrode to the drain line.

According to a second aspect of the present invention, there is provided a method for manufacturing a liquid crystal display providing a wide viewing angle in which a display with a wide viewing angle is enabled by placing a common electrode and a pixel electrode on a protecting film of a thin film transistor and by rotating a direction of a molecular axis of a liquid crystal molecule making up of a liquid crystal layer in a hermetically sealed manner on a surface being parallel to a surface of an active matrix substrate, the method including:

a process of forming a gate electrode metal layer on a transparent insulating substrate and forming a gate electrode by patterning using photolithography;

a process of sequentially forming an interlayer insulating film, an a⁻Si layer, an n⁺ a⁻Si layer, and a drain electrode metal layer on the transparent insulating substrate and forming a drain line and an island by removing an unwanted portion of the drain electrode metal layer and performing patterning and then ashing processing on portions being not exposed and performing reflow processing using photolithography employing a photo resist having a plurality of regions each having a different thickness and then by removing a part of the n⁺a⁻Si layer and a part of the a⁻Si layer and then by peeling the photo resist having undergone the reflow processing;

a process of forming an insulating film on the transparent insulating substrate and forming an insulating film contact which passes through the insulating film and is used to provide a connection to a source electrode of the island at a specified position by patterning using photolithography; and a process of forming a transparent conductive film which becomes a pixel electrode on the transparent insulating substrate and forming the pixel electrode and the common electrode by removing unwanted portions of the transparent conductive film by patterning using photolithography and of connecting the pixel electrode to the source electrode.

According to a third aspect of the present invention, there is provided a method for manufacturing a liquid crystal display providing a wide viewing angle in which a display with a wide viewing angle is enabled by placing a common electrode and a pixel electrode on a protecting film of a thin film transistor and by rotating a direction of a molecular axis of a liquid crystal molecule making up of a liquid crystal layer in a hermetically sealed manner on a surface being parallel to a surface of an active matrix substrate, the method including:

a process of forming a gate electrode metal layer on a transparent insulating substrate and forming a gate electrode by patterning using photolithography;

a process of sequentially forming an interlayer insulating film, an a⁻Si layer, an n⁺ a⁻Si layer, and a drain electrode metal layer on the transparent insulating substrate and forming a drain line and an island by removing unwanted portions of the a⁻Si layer, the n⁺ a⁻Si layer and the drain electrode metal layer and performing patterning and then ashing on portions being not exposed employing photolithography using a photo resist having a plurality of regions each having a different thickness and then by removing a specified part of the a⁻Si layer, the n⁺a⁻Si layer and the drain electrode metal layer and then by peeling the portions being not exposed;

a process of forming an insulating film on the transparent insulating substrate and forming an insulating film contact which passes through the insulating film and is used to provide a connection to a source electrode of the island at a specified position by patterning using photolithography; and a process of forming a transparent conductive film which becomes a pixel electrode on the transparent insulating substrate and forming the pixel electrode and the common electrode by removing unwanted portions of the transparent conductive film by patterning using photolithography and of connecting the pixel electrode to the source electrode.

According to a fourth aspect of the present invention, there is provided a method for manufacturing a liquid crystal display providing a wide viewing angle in which a display with a wide viewing angle is enabled by placing a common electrode and a pixel electrode on a protecting film of a thin film transistor and by rotating a direction of a molecular axis of a liquid crystal molecule making up of a liquid crystal layer in a hermetically sealed manner on a surface being parallel to a surface of an active matrix substrate, the method including:

a process of sequentially forming a gate electrode metal layer, a gate insulator, and an a⁻Si layer on a transparent insulating substrate and forming an island made up of a gate electrode, a gate insulating film and a semiconductor layer by patterning using photolithography;

a process of sequentially forming an interlayer insulating film and a drain electrode metal layer on the transparent insulating substrate and forming a drain line by removing a specified region of the drain electrode metal layer by patterning using photolithography;

a process of forming an insulating film on the transparent insulating substrate and forming an insulating film contact which passes through the insulating film and is used to provide a connection to a source electrode and a drain electrode at a specified position by a printing method; and a process of forming a transparent conductive film on the transparent insulating substrate and forming the pixel electrode and common electrode each having a comb-teeth-like configuration by removing unwanted portions of the transparent conductive film so that the pixel electrode and the common electrode are arranged in a staggered manner by patterning using photolithography and of connecting the source electrode to the pixel electrode and connecting the drain electrode to the drain line.

According to a fifth aspect of the present invention, there is provided a method for manufacturing a liquid crystal display providing a wide viewing angle in which a display with a wide viewing angle is enabled by placing a common electrode and a pixel electrode on a protecting film of a thin film transistor and by rotating a direction of a molecular axis of a liquid crystal molecule making up of a liquid crystal layer in a hermetically sealed manner on a surface being parallel to a surface of an active matrix substrate, the method including:

a process of forming a gate electrode metal layer on a transparent insulating substrate and forming a gate electrode by patterning using photolithography;

a process of sequentially forming an interlayer insulating film, an $a^-$Si layer, an $n^+$ $a^-$Si layer, and a drain electrode metal layer on the transparent insulating substrate and forming a drain line and an island by removing unwanted portions of the drain electrode metal layer and performing patterning and then ashing and reflow processing on portions being not exposed employing photolithography using a photo resist having a plurality of regions each having a different thickness and then by removing a part of the $n^+$ $a^-$Si layer and a part of the a–Si layer and by peeling the photo resist having undergone the reflow processing;

a process of forming an insulating film on the transparent insulating substrate and forming an insulating film contact which passes through the insulating film and is used to provide a connection to a source electrode of the island at a specified position by a printing method; and a process of forming an transparent conductive film which becomes a pixel electrode on the transparent insulating substrate and forming the pixel electrode and the common electrode by removing unwanted portions of the transparent conductive film by patterning using photolithography and of connecting the pixel electrode to the source electrode.

According to a sixth aspect of the present invention, there is provided a method for manufacturing a liquid crystal display providing a wide viewing angle in which a display with a wide viewing angle is enabled by placing a common electrode and a pixel electrode on a protecting film of a thin film transistor and by rotating a direction of a molecular axis of a liquid crystal molecule making up of a liquid crystal layer in a hermetically sealed manner on a surface being parallel to a surface of an active matrix substrate, the method including:

a process of forming a gate electrode metal layer on a transparent insulating substrate and forming a gate electrode by patterning using photolithography;

a process of sequentially forming an interlayer insulating film, an $a^-$Si layer, an $n^+$ $a^-$Si layer, and a drain electrode metal layer on the transparent insulating substrate and forming a drain line and an island by removing unwanted portions of the a–Si layer, the $n^+$ $a^-$Si layer and the drain electrode metal layer and performing patterning and then ashing on portions being not exposed employing photolithography using a photo resist having a plurality of regions each having a different thickness and then by removing a specified part of the $a^-$Si layer, the $n^+a^-$Si layer and the drain electrode metal layer and then by peeling the portions being not exposed;

a process of forming an insulating film on the transparent insulating substrate and forming an insulating film contact which passes through the insulating film and is used to provide a connection to a source electrode of the island at a specified position by a printing method; and a process of forming a transparent conductive film which becomes a pixel electrode on the transparent insulating substrate and forming the pixel electrode and the common electrode by removing unwanted portions of the transparent conductive film by patterning using photolithography and of connecting the pixel electrode to the source electrode.

In the foregoing, a preferable mode is one wherein the insulating film is made up of an inorganic insulating film existing at a lower portion of the insulating layer and of an organic insulating film existing at a upper portion of the insulating layer and wherein, after an aperture portion is formed at a specified position of the organic insulating film existing at the upper portion of the insulating film by photolithography, etching is performed on the inorganic insulating film existing at the lower portion of the insulating film using the organic insulating film existing at the upper portion of the insulating film as a mask.

Also, a preferable mode is one wherein the gate electrode is a single layer made of a metal having a high melting point or is a two-layered film containing an upper layer made of a metal having a high melting point and a lower layer made of Al (aluminum) or Al alloy.

Also, a preferable mode is one wherein each of the source electrode and the drain electrode is a single layer made of a metal having a high melting point or a two-layered film containing an upper layer made of a metal having a high melting point and a lower layer made of Al or Al alloy, or a three-layered film containing an upper layer made of a metal having a high melting point, an intermediate layer made of Al or Al alloy and a lower layer made of a metal having a high melting point.

Also, a preferable mode is one wherein the metal having a high melting point is Cr (chromium) or Mo (molybdenum).

Furthermore, a preferable mode is one wherein the insulating film is photosensitive.

With the above configurations, the method for manufacturing an LCD that can provide a wide viewing angle which enables its manufacturing processes to be shortened and which can prevent steps of a TFT from becoming larger and can provide excellent coverage by a passivation film.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
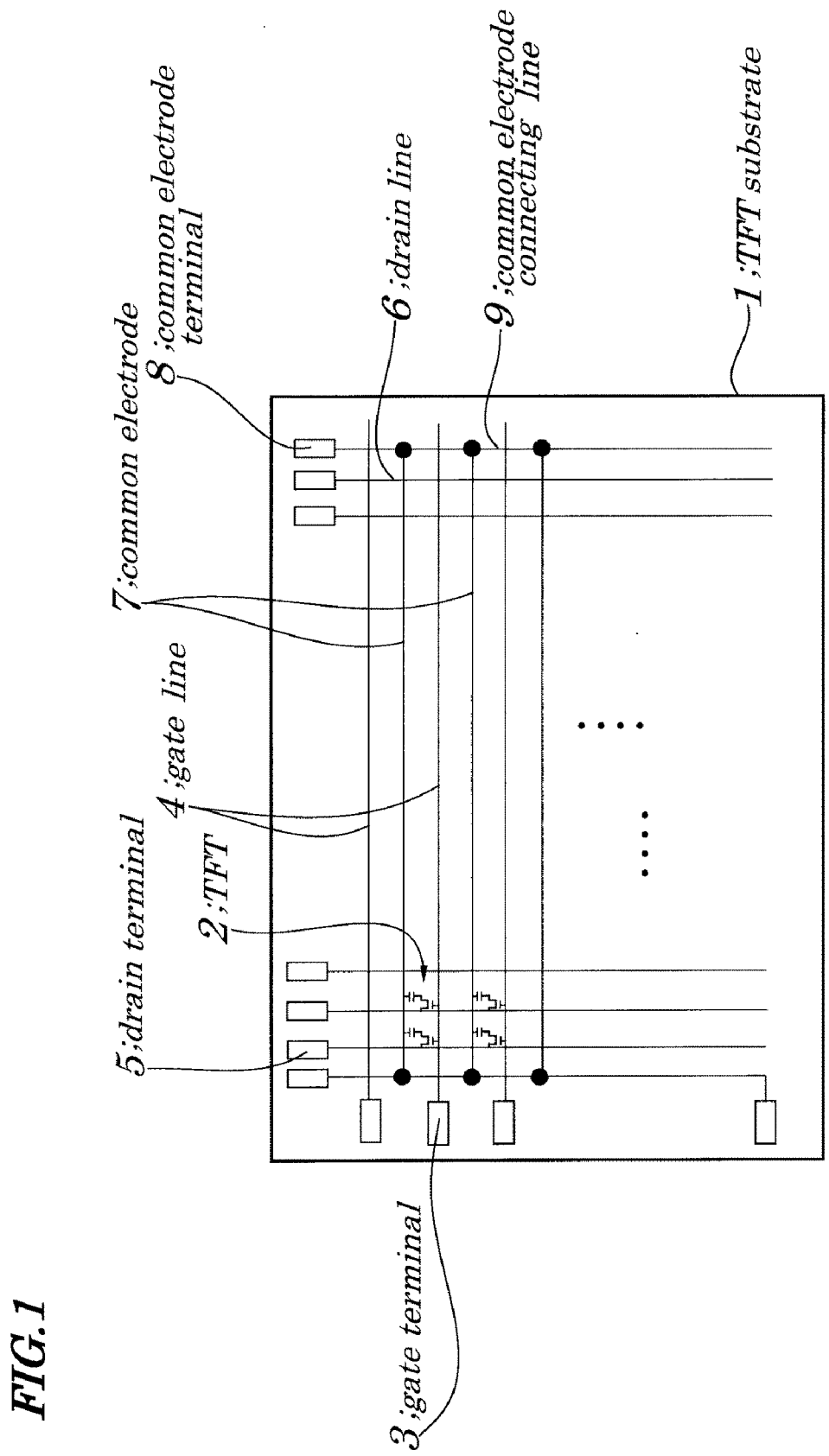
FIG. 1 is a circuit diagram showing configurations of an active matrix substrate of an LCD providing a wide viewing angle according to a first embodiment of the present invention.

FIG. 1 is a circuit diagram showing configurations of an active matrix substrate of an LCD providing a wide viewing angle of a first embodiment of the present invention. In the LCD of the first embodiment, an IPS-type active matrix substrate having a ITO-TCP (Tape Carrier Package) structure is used in which a common electrode 7 and a pixel electrode are arranged on a protecting film (organic film) of a TFT. ITO is employed as a material for the pixel electrode. Therefore, a display is performed by rotating a direction of a molecular axis of a liquid crystal making up of a liquid crystal layer in a hermetically sealed manner on a surface being parallel to a surface of the active matrix substrate. In the active matrix substrate, on a TFT substrate 1 a TFT 2, a gate terminal 3, a drain terminal 5, a gate line 4 extending from the gate terminal 3, a drain line 6 extending from the drain terminal 5, the common electrode 7, a common electrode terminal 8 and a common electrode connecting line 9 extending from the common electrode terminal 8 and connecting with the common electrode 7 are mounted.

Figure 2:
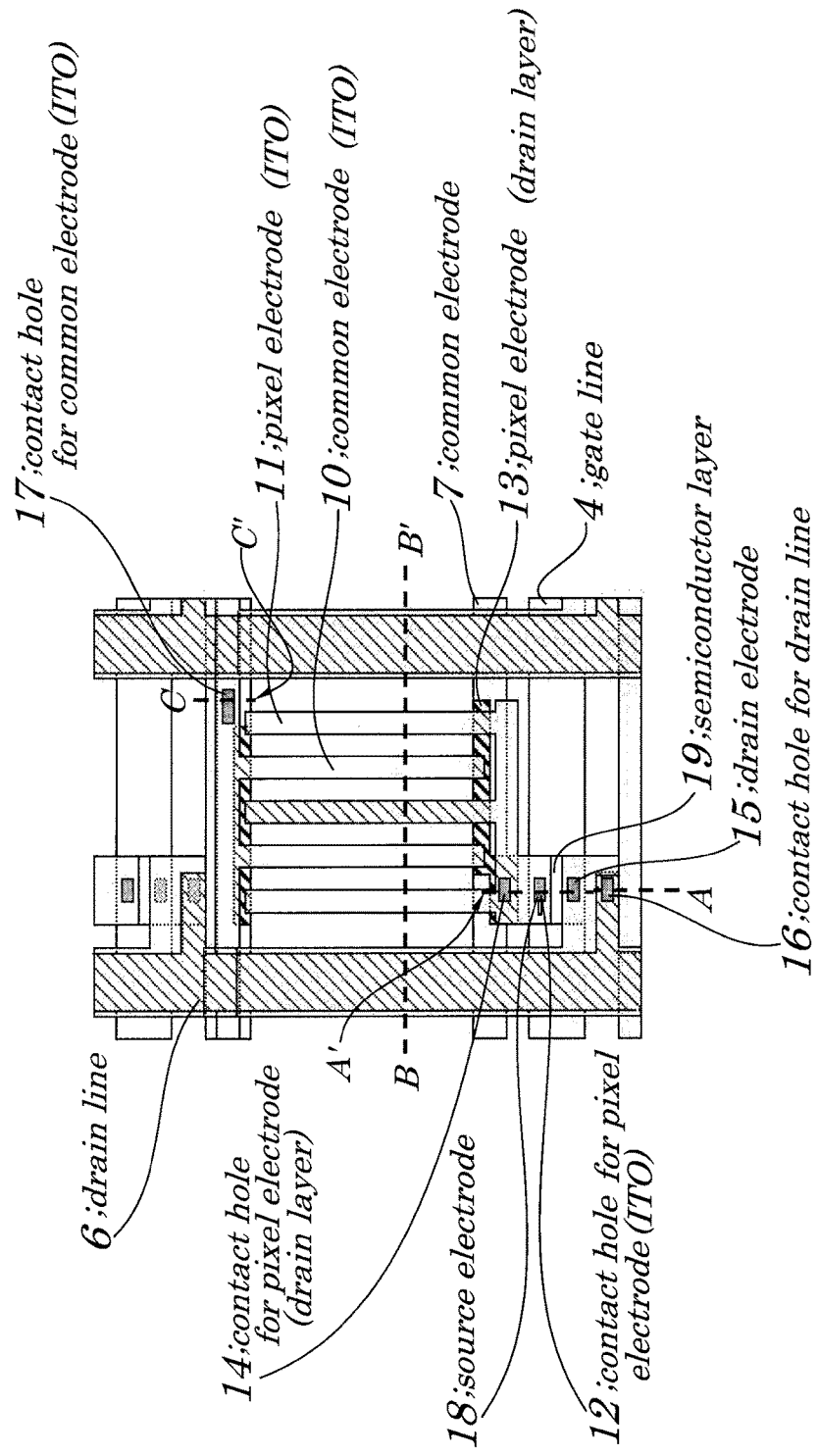
FIG. 2 is a plan view showing configurations of one pixel portion making up the LCD providing the wide viewing angle of the first embodiment of the present invention.

FIG. 2 is a plan view showing configurations of one pixel portion making up the LCD providing the wide viewing angle of the first embodiment. In the one pixel portion of the LCD of the embodiment the drain line 6, the gate line 4, the common electrode 7, a pixel electrode (drain layer) 13, a common electrode (ITO) 10, and a pixel electrode (ITO) 11 are provided. A TFT portion is made up of a source electrode 18, a drain electrode 15, and a semiconductor layer 19. Moreover, a contact hole 14 for the pixel electrode (drain layer) 13, a contact hole 12 for a pixel electrode (ITO) 11 and, a contact hole 16 for the drain line 6 are provided.

Figure 3:
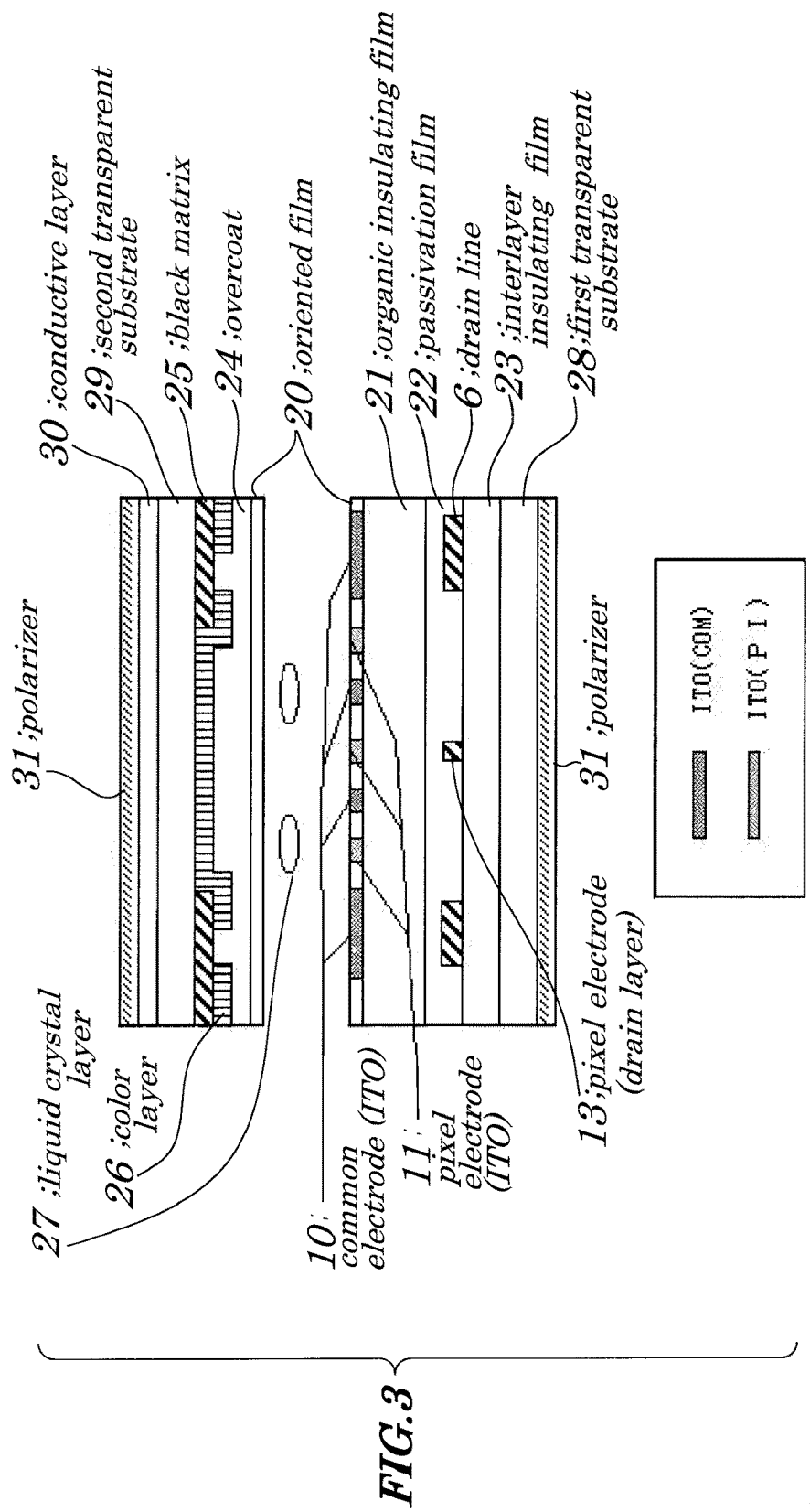
FIG. 3 is a cross-sectional view showing configurations of the one pixel portion making up the LCD providing the wide viewing angle of the first embodiment of the present invention.

FIG. 3 is a cross-sectional view showing configurations of the one pixel portion making up the LCD providing the wide viewing angle of the first embodiment. As shown in FIG. 3, a first transparent substrate 28 is placed in a manner to face a second transparent substrate 29 with a liquid crystal 27 and orientated films 20 being sandwiched between the first transparent substrate 28 and the second transparent substrate 29. On a side of the first transparent substrate 28 are sequentially formed an interlayer insulating film 23, the pixel electrode (drain layer) 13, the drain line 6, a passivation film 22, an organic insulating film 21, the common electrode (ITO) 10, the pixel electrode (ITO) 11 and a polarizer 31. On a side of the second transparent substrate 29 a black matrix 25, a color layer 26, an overcoat 24, a conductive layer 30, and another polarizer 31 are formed.

FIGS. 4 to 8 are cross-sectional views showing processes for manufacturing the LCD of the first embodiment shown in FIGS. 1 to 3. In each of FIGS. 4 to 8, a TFT element portion shows a cross-sectional view of the TFT of FIG. 2, taken along a line A—A', a pixel portion shows a cross-sectional view of a part of the pixel portion of FIG. 2, taken along a line B-B', a common electrode contact hole portion shows a cross-sectional view of the contact hole portion of FIG. 2, taken along a line C-C', a gate terminal portion shows a cross section of a gate terminal 3, and a drain terminal portion shows a cross section of a drain terminal 5.

Figure 4:
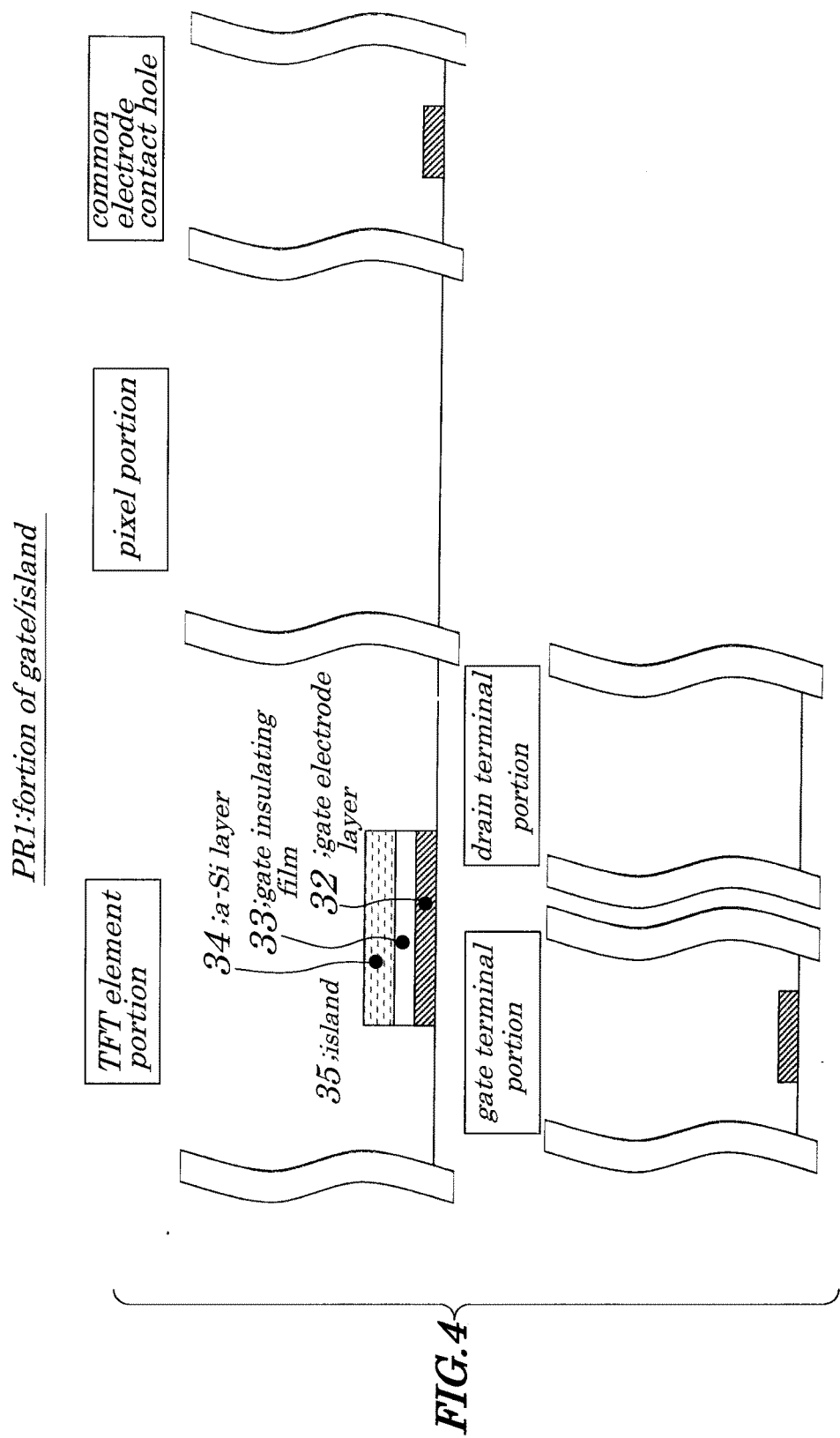
FIG. 4 is a cross-sectional view showing a first photo resist process (PR 1) for manufacturing the LCD of the first embodiment of the present invention.

First, as shown in FIG. 4, on the transparent insulating substrate 28 made of glass or the like are sequentially formed a gate electrode layer 32 having an upper layer made of a metal with a high melting point such as Cr, Mo (Molybdenum), Ti (Titanium) or the like and a lower layer made of Al (Aluminum) or the like, a gate insulating film 33 made of SiNx (silicon nitride film) or the like, and an a⁻Si layer 34 which becomes a semiconductor layer 19. The gate electrode layer 32 is formed by performing sputtering of Al to form the lower layer of the gate electrode layer 32 so that a thickness of the Al layer becomes 100 nm to 300 nm and by performing sputtering of a metal having a high melting point such as the Cr, Mo, Ti or the like to form the upper layer of the gate electrode layer 32 so that a thickness of the upper layer becomes 50 nm to 150 nm. The gate insulating film 33 and the a⁻Si layer 34 are formed by using a plasma CVD (Chemical Vapor Deposition) method so that a thickness of the gate insulating film 33 becomes about 200 nm to 400 nm and a thickness of the a⁻Si layer 34 becomes about 100 nm to 300 nm. Then, by using a first mask, a photo resist pattern is formed in a region in which the gate electrode layer 32 and the gate line 4 are to be formed and dry etching is performed to remove portions of the gate electrode layer 32, gate insulating film 33 and a⁻Si layer 34 that are not covered by the photo resist pattern.

Figure 5:
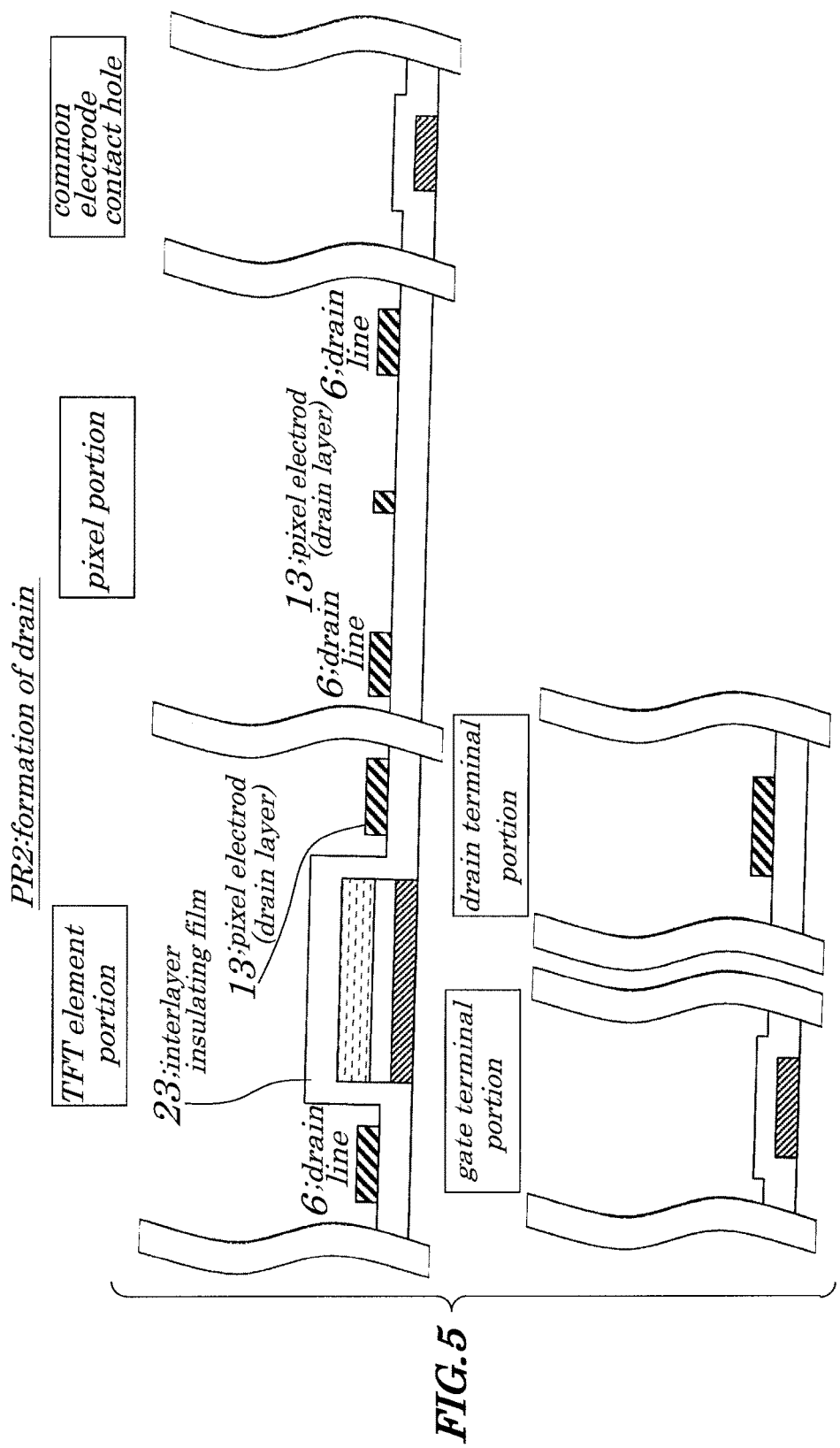
FIG. 5 is a cross-sectional view showing a second photo resist process (PR 2) for manufacturing the LCD of the first embodiment of the present invention.

Next, as shown in FIG. 5, the interlayer insulating film 23 made of SiNx (silicon nitride) is formed on an entire surface of the transparent substrate 28 by using the plasma CVD method. On the interlayer insulating film 23, a stacked layer is formed using a sputtering method. The stacked layer becomes the source electrode 18/drain electrode 15 (not shown), and has a layer made of a metal with a high melting point such as Cr, Mo, Ti or the like in a manner so as to be stacked in an upper portion of the stacked layer, a layer made of Al or the like in a manner so as to be stacked in an intermediate portion of the stacked layer, and a layer made of a metal with a high melting point such as Cr, Mo Ti, or the like in a manner so as to be stacked in a lower portion of the stacked layer. A thickness of the interlayer insulating film 23 is preferably about 100 nm to 200 nm. A thickness of the layer made of the metal with a high melting point such as Cr, Mo Ti, or the like in a manner so as to be stacked in the upper portion of the stacked layer (the source electrode 18/drain electrode 15) is preferably about 50 nm to 150 nm. A thickness of the layer made of Al or the like is preferably about 100 nm to 300 nm. A thickness of the layer made of the metal with a high melting point such as Cr, Mo Ti, or the like in a manner so as to be stacked in the lower portion of the stacked layer is preferably about 30 nm to 100. After the formation of the stacked layer, by using a second mask, a photo resist pattern is formed in a manner so as to cover the drain line 6 and etching is performed to remove unwanted metal layers to form the drain line 6.

Figure 6:
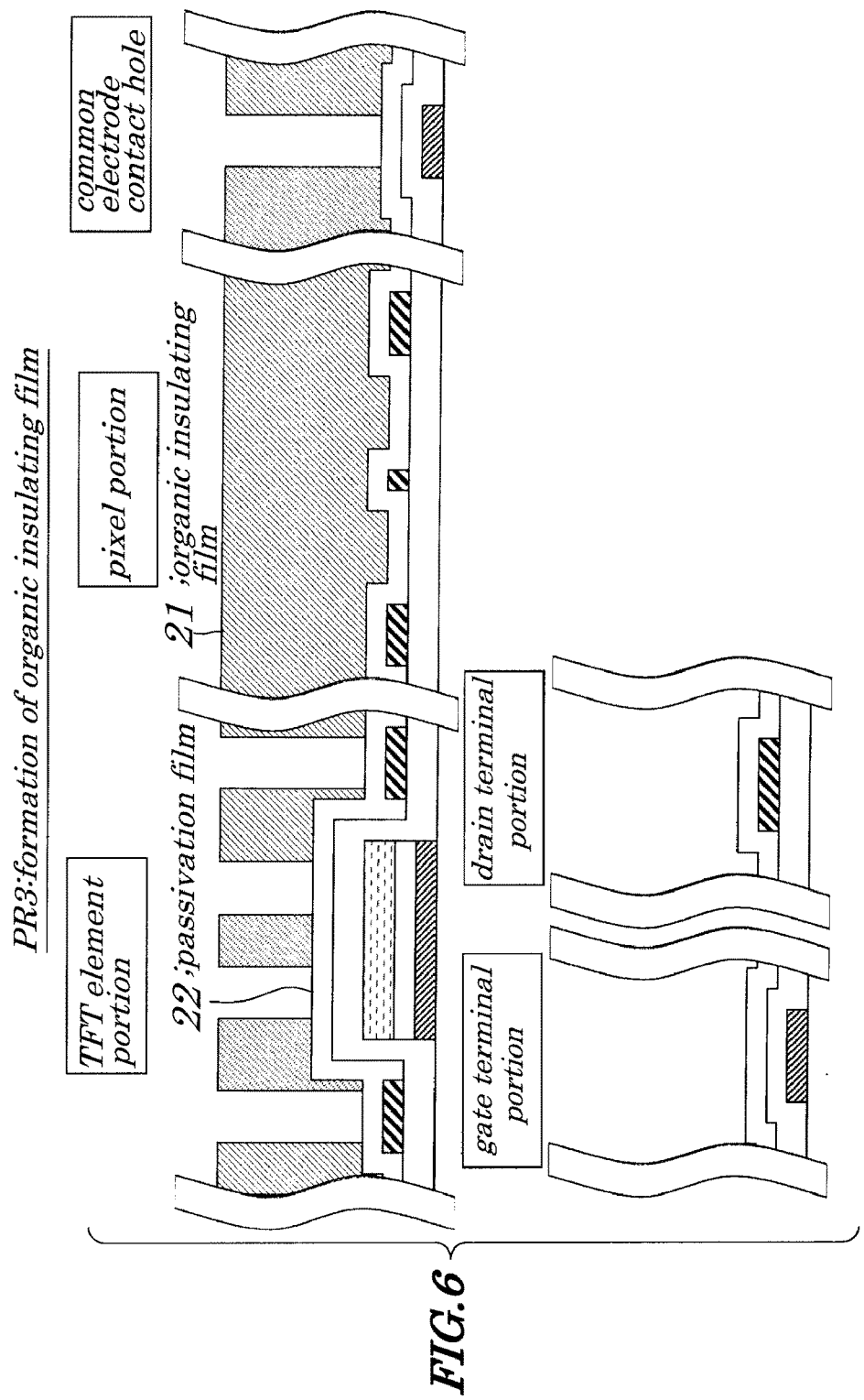
FIG. 6 is a cross-sectional view showing a third photo resist process (PR 3) for manufacturing the LCD of the first embodiment of the present invention.

Next, as shown in FIG. 6, the passivation film 22 made of SiNx or the like is formed on an entire surface of the substrate 28 by sputtering in a manner that its thickness is, for example, 100 nm to 200 nm. Here, as a material for the passivation film 22, in order to form a contact hole in a satisfactory manner in later processes, it is preferable that a material having a wide selection ratio for etching for the a⁻Si layer 34 and the gate insulating film 33.

Then, also as shown in FIG. 6, the organic insulating film 21, for example, a positive-type novolak resist or the like, is formed on the entire surface of the transparent insulating substrate 28 in a manner that its thickness is 2.0 μm to 3.5 μm. As a material for the organic insulating film 21, for example "OPTMER™ PC series" (trade name) manufactured by JSR Corp. or the like may be used. Then, by using a third mask, a photo resist pattern having an aperture in a source aperture portion 36 in an upper portion of the a⁻Si layer 34, a drain aperture section 37, the gate line 4, and the drain line 6 is formed and the organic insulating film 21 is formed.

Figure 7:
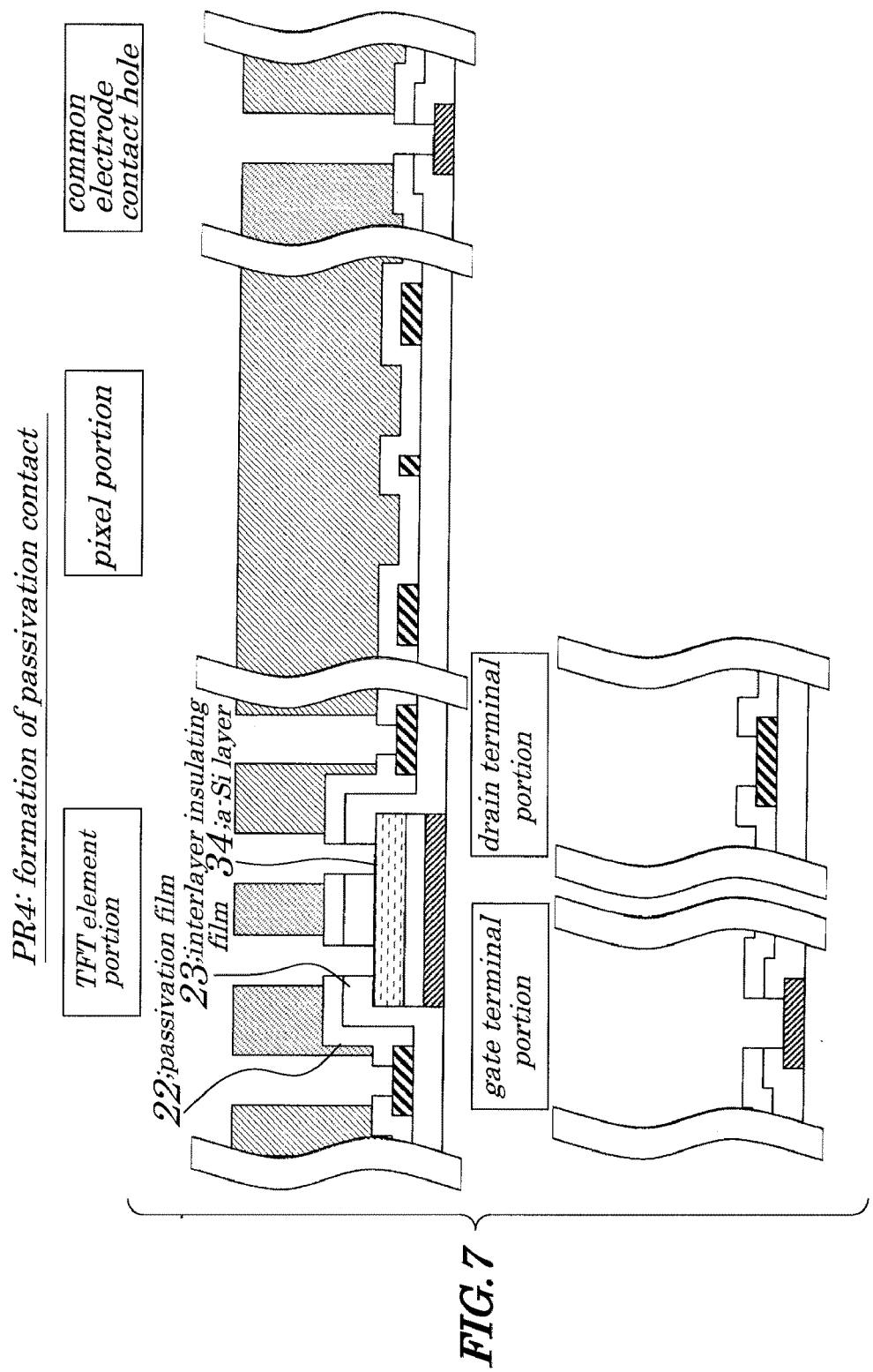
FIG. 7 is a cross-sectional view showing a fourth photo resist process (PR 4) for manufacturing the LCD of the first embodiment of the present invention.

Next, as shown in FIG. 7, exposed portions of the passivation film 22 and of the interlayer insulating film 23 are removed by a dry etching method using a fourth mask to form specified contact holes. In order to ensure an ohmic contact with the a⁻Si layer 34, the first transparent substrate 28, held in an atmosphere of PH₃ plasma and P (Phosphorous), is diffused on the a⁻Si layer 34 to have the n⁺a⁻Si layer 34 formed on a surface of the a⁻Si layer 34. This is achieved by treatment using plasma equipment performed at a temperature of 300° C. using a PH₃/H₂ (0.5% PH₃) gas being supplied at 1000 sccm (standard cubic centimeter) at a pressure of 200 Pa and for 5 minutes at 0.1 W/cm² of RF (Radio Frequency) power.

Figure 8:
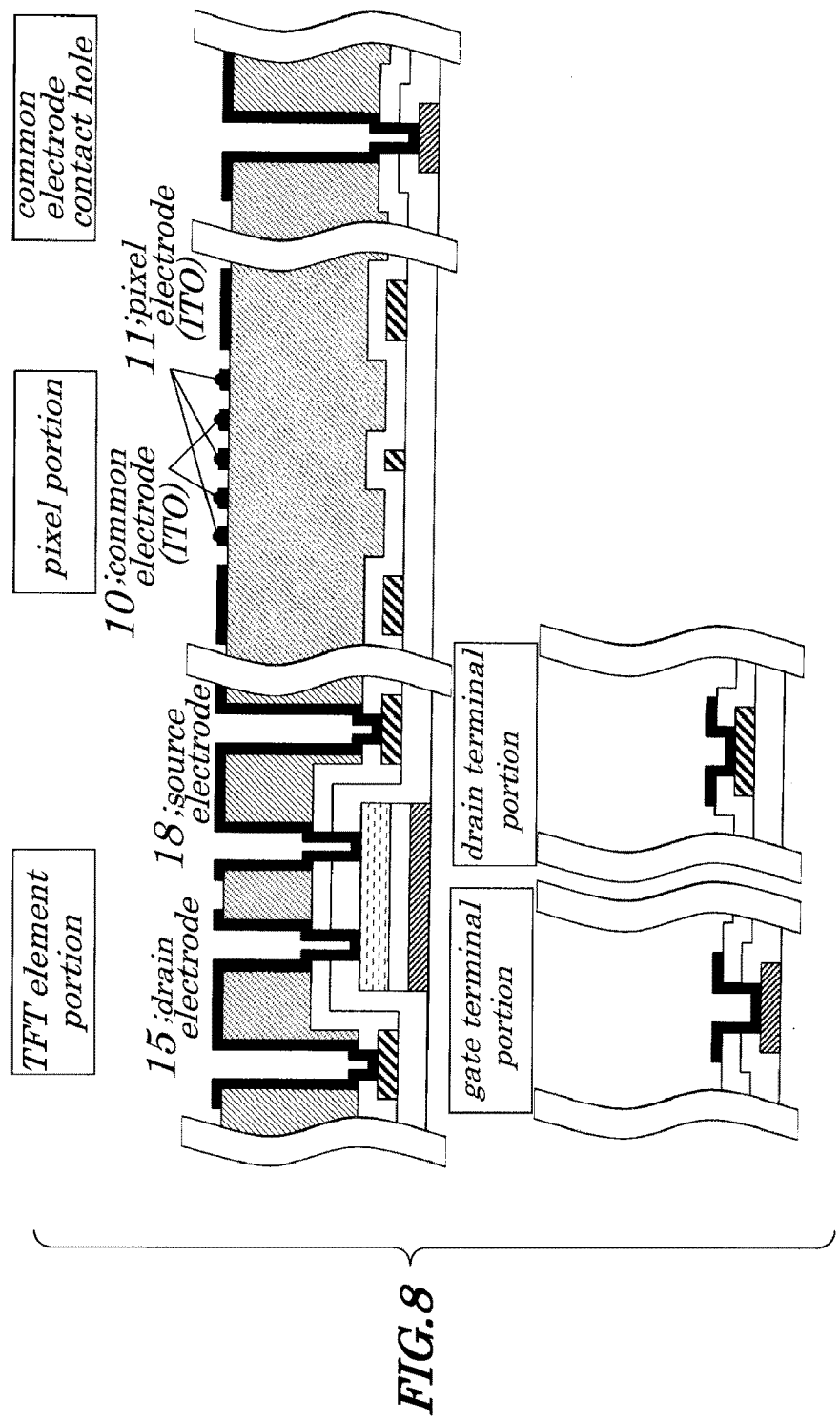
FIG. 8 is a cross-sectional view showing a fifth photo resist process (PR 5) for manufacturing the LCD of the first embodiment of the present invention.

Then, as shown in FIG. 8, sputtering of ITO on the entire surface of the first transparent substrate 28 is performed to form an ITO film which becomes the pixel electrode 11 in a manner that its thickness is about 40 nm to 120 nm and, by using a fifth mask, unwanted portions of the ITO film is removed by a wet etching method to connect the source electrode 18 to the pixel electrode 11 and to connect the drain electrode 15 to the drain line 6. Moreover, in the first embodiment, as the material for the pixel electrode 11, ITO is used. However, one skilled in the art will appreciate that in addition to ITO, ZnO (Zinc Oxide), IZO (Indium Zinc Oxide) obtained by using Zn instead of Sn in ITO, or the like may be employed.

Finally, by using the ITO film as a mask, the a⁻Si layer 34 and the gate insulating film 33 are removed by performing the dry etching process to finish the active matrix substrate.

Figure 9:
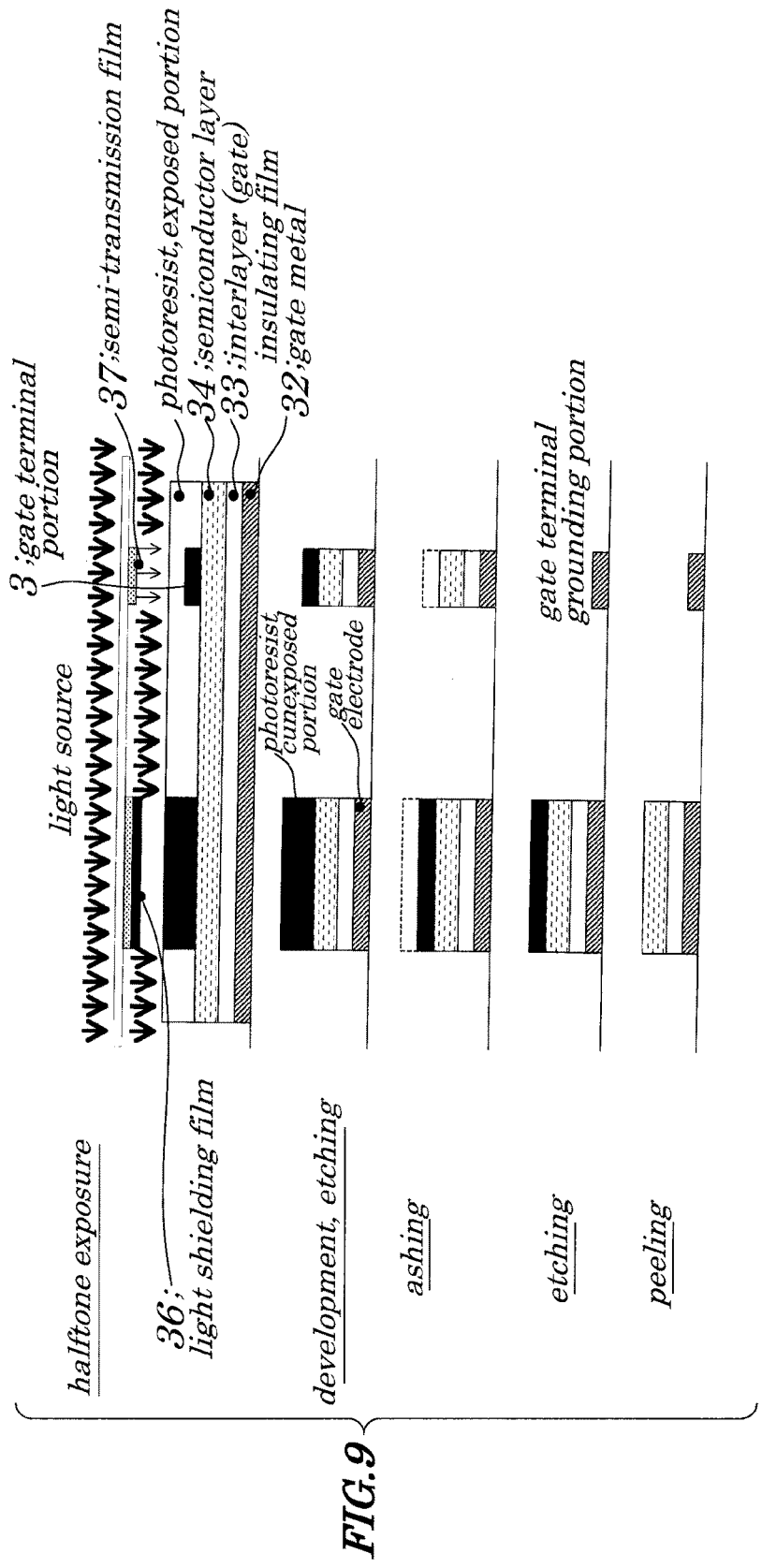
FIG. 9 is a cross-sectional view explaining, more in detail, the first photo resist process (PR 1) for manufacturing the LCD of the first embodiment of the present invention.

FIG. 9 is a cross-sectional view explaining, in detail, the first photo resist process (PR 1) for forming the gate/island in manufacturing the LCD of the first embodiment. In this embodiment, a photo resist is formed on the island 35 made up of a gate metal (metal) 32, the interlayer (gate) insulating film 33 and the a⁻Si (amorphous silicon semiconductor) layer 34. A halftone exposure is performed in which a light shielding film 36 is used for the island 35 and a semi-transmissive film 37 is used for the gate terminal portion 3. After the exposure process, development and etching are performed and ashing is performed to remove the photo resist (portions being not exposed) existing on the island 35 and on the gate terminal portion 3. Then, etching is performed on the a Si layer 34 and the interlayer (gate) insulating film 33 in the gate terminal portion 3. Finally, a remaining photo resist existing on the island 35 is peeled off.

Thus, according to the method for manufacturing the LCD providing a wide viewing angle of the first embodiment, by using only five masks, the gate electrode layer 32, drain electrode 15, and pixel electrode 11 can be separated from each other using insulating films. And a channel protection-type active matrix substrate in which a surface and sidewalls of the a⁻Si layer 34 is covered completely by the interlayer insulating film 23 and the passivation film 22 is formed. Therefore, the manufacturing processes can be simplified at least by one photo resist process compared with the conventional method.

Moreover, materials used in the first embodiment will be specifically explained below. As a material for the gate electrode layer 32, the film made of Cr, Mo, Cr/Al, Mo/Al or the like with a thickness of 100 nm to 450 nm is used. As a material for the source electrode 18/drain electrode 15, the film made of Cr, Mo, Cr/Al, Mo/Al/Mo, or the like with a thickness of 150 nm to 550 nm is used. As a material for the pixel electrodes 11 and 13, the film made of ITO with a thickness of 40 to 120 nm is used. As a material for the gate insulating film 33, the SiNx film with a thickness of 200 nm to 400 nm is used. As a material for the a-layer (semiconductor layer) 34, the a⁻Si film with a thickness of 150 nm to 300 nm and the n⁺ a⁻Si film with a thickness of 30 nm to 70 nm are used. As a material for the passivation film 22, the SiNx film with a thickness of 100 nm to 300 nm is used. As a material for the organic insulating film 21, the photosensitive novolak resist (for example, the "OPTMER™ PC series" manufactured by JSR Corp.,) with a thickness of 2.0 μm to 3.5 μm is used.

Moreover, as a material for the glass substrate, a plate made of non-alkaline glass with a thickness of 0.7 mm is used. As a material for a color filter, a negative-type photosensitive acrylic pigment diffusing resist (for example, "OPTMER™ CR series" manufactured by JSR Corp.) with a thickness of 1.0 μm to 1.5 μm is used. As a material for the black matrix 25, a negative-type photosensitive acrylic pigment diffusing resist having an optical density (OD value) being 3 or more and sheet resistance value being $10^{10}\Omega/\square$ or more, or a carbon resist (for example, "OPTMER™ CR series" manufactured by JSR Corp.) is used. As a material for the polarizer 31, an iodine light polarizing film (for example, "NPF™ CR series" manufactured by Nitto Denko Corp., or "SUMIKALAN™ series" manufactured by Sumitomo Chemical Co., Ltd.) is used. As a facing electrode, the ITO film having sheet resistance of $20\Omega/\square$ to $40\Omega/\square$ with a thickness of 80 nm to 150 nm is used. As a material for the liquid crystal 27, a fluorine compound (for example, "LIXON™ series" manufactured by Chisso Petrochemical Corp.) is used. As a material for the in-plane spacer, a film made of a di-vinyl-benzene crosslinking polymer with a thickness of 4.0 μm to 5.5 μm is used. As a material for a sealing member, an epoxy resin adhesive (for example, "STRACTBOND™ series" manufactured by Mitsui Chemical Co., Ltd.) is used. As a material for the hole-sealing member, a UV (Ultraviolet) curing acrylate resin is used. As a material for the oriented film 20, a polyimide oriented film (for example, "SUNEVER™ series" manufactured by Nissan Chemical Co., Ltd., or "OPTMER™ AL series" manufactured by JSR Corp.) with a thickness of 30 nm to 60 nm is used.

Second and Third Embodiments

Figure 10:
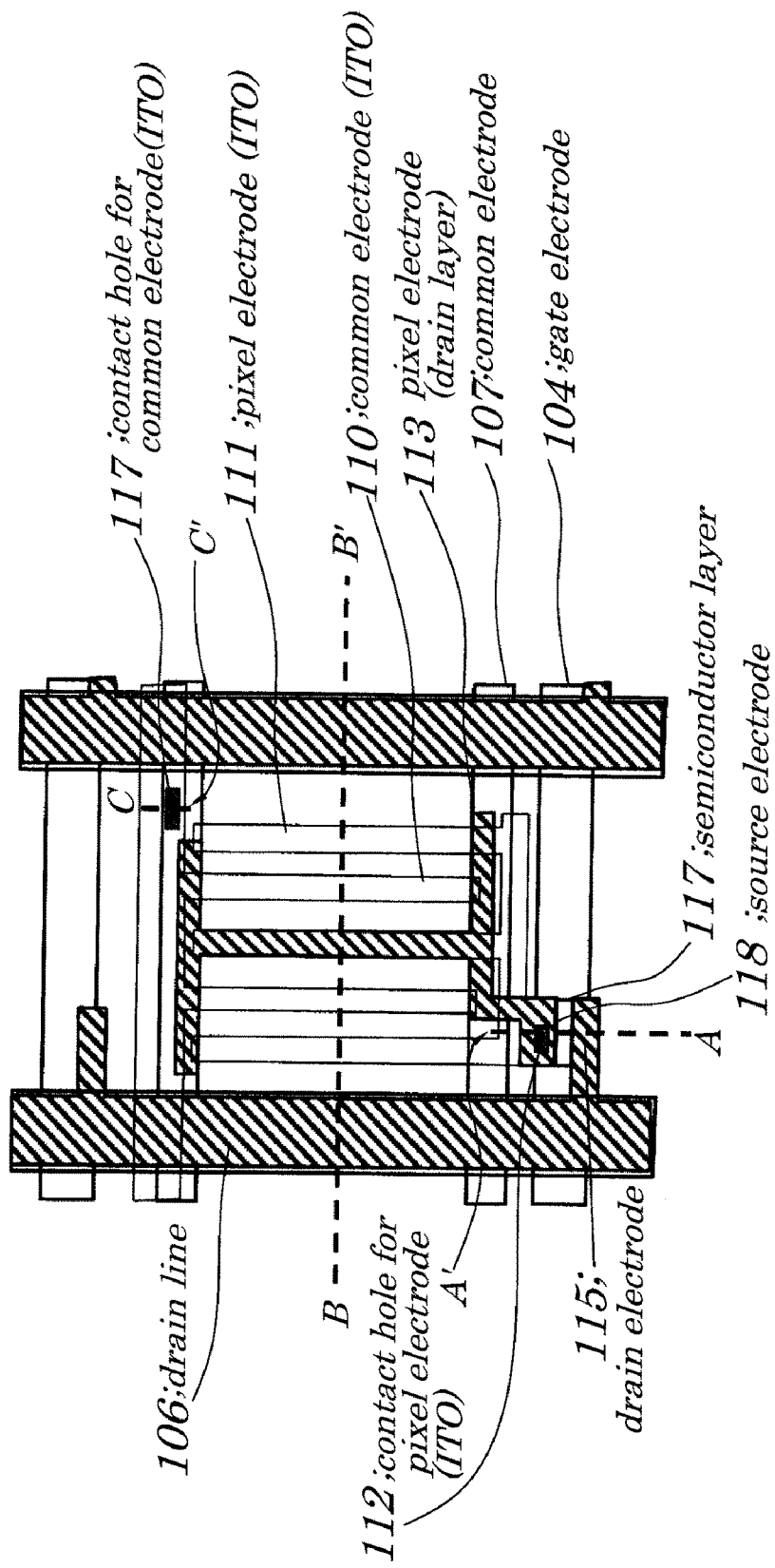
FIG. 10 is a plan view showing configurations of one pixel portion making up an LCD providing a wide viewing angle of second and third embodiments of the present invention.

FIG. 10 is a plan view showing configurations of one pixel portion making up an LCD providing a wide viewing angle of the second and third embodiments of the present invention. In FIG. 10, the contact hole 14 for the pixel electrode (drain layer) 13 and the contact hole 16 for the drain line 6 shown in FIG. 2 are not seen. This is due to a difference in manufacturing methods described later. In FIG. 10, same reference numbers are assigned to corresponding parts having same functions as those in the first embodiment shown in FIG. 2 and their descriptions are omitted accordingly. Also, materials for components in the second and third embodiments are same as those in the first embodiment and their descriptions are omitted accordingly.

Figure 11:
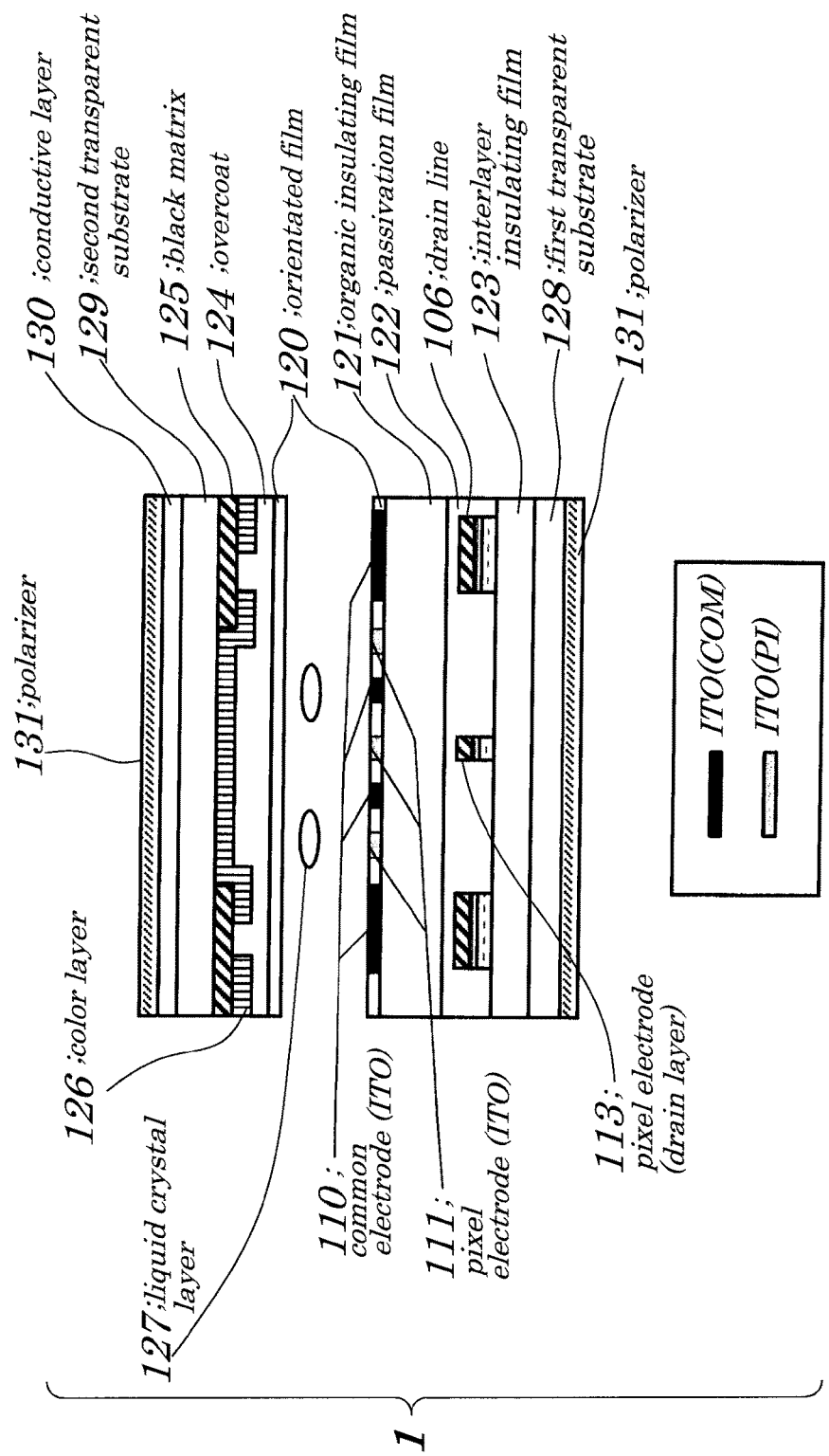
FIG. 11 is a cross-sectional view showing configurations of the one pixel portion making up the LCD providing the wide viewing angle of the second and third embodiments of the present invention.

FIG. 11 is a cross-sectional view showing configurations of the one pixel portion making up the LCD providing a wide viewing angle of the second and third embodiments. As shown in FIG. 11, a first transparent substrate 128 is placed in a manner to face a second transparent substrate 129 with a liquid crystal layer 127 and orientated films 120 being sandwiched between the first transparent substrate 128 and the second transparent substrate 129. On a side of the first transparent substrate 128 are sequentially formed (1) an interlayer insulating film 123, (2) a pixel electrode (drain layer) 113, a drain line 106 and a drain electrode 115, (3) a passivation film 122, (4) an organic insulating film 121, (5) a common electrode (ITO) 110 and a pixel electrode (ITO) 111, and (6) a polarizer 131. On a side of the second transparent substrate 129 are formed (1) a black matrix 125, (2) a color layer 126, (3) an overcoat 124, (4) a conductive layer 130, and (5) a polarizer 131. The configurations of the pixel of the second and third embodiments shown in FIG. 11 differ greatly from those in the first embodiment shown in FIG. 2 in that an a⁻Si layer 138 and an n⁺ a⁻Si layer 139 both existing under the drain line 106 can be seen.

FIGS. 12 to 18 are cross-sectional views explaining processes for manufacturing the LCD providing the wide viewing angle of the second and third embodiments.

Figure 12:
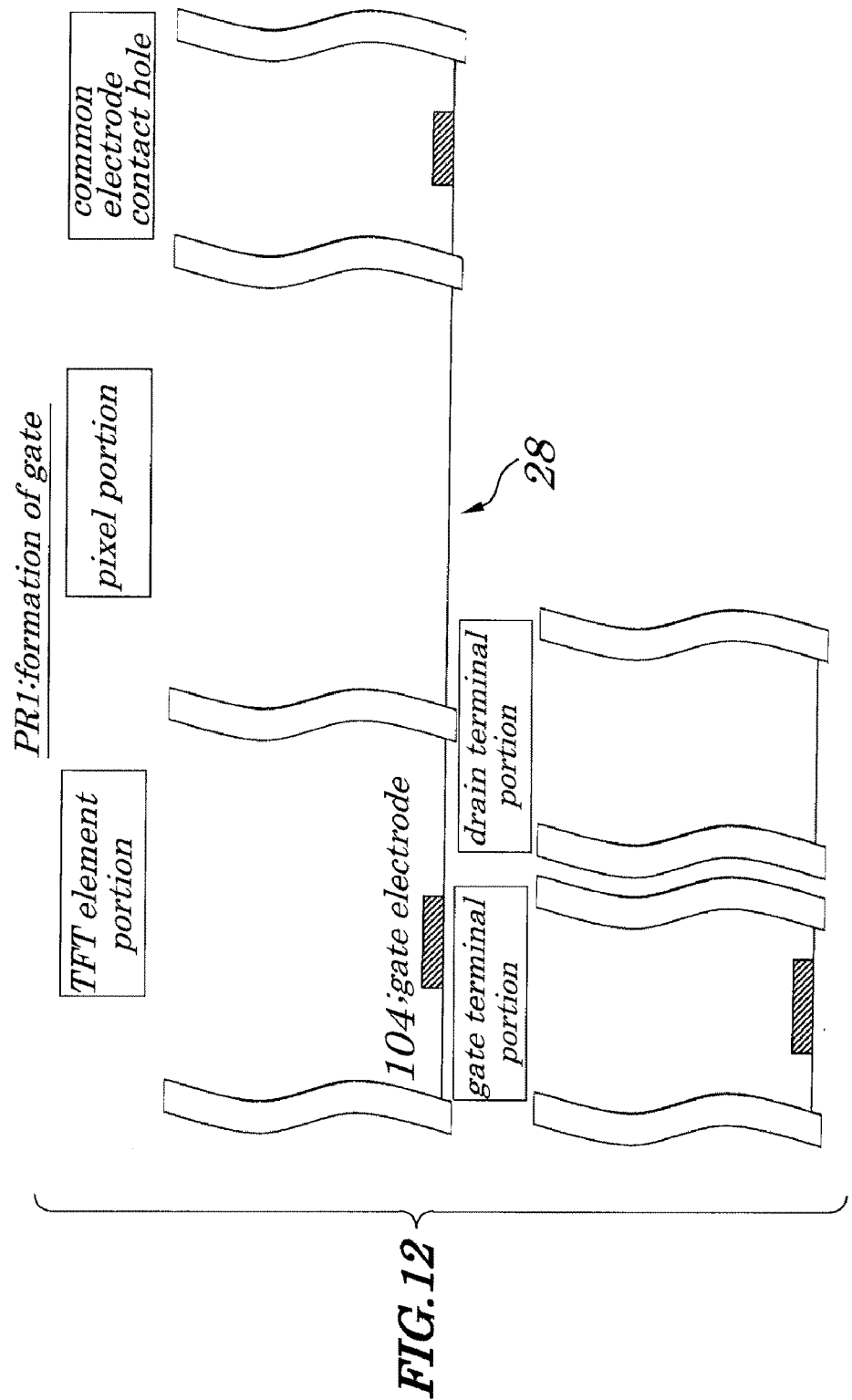
FIG. 12 is a cross-sectional view showing a first photo resist process (PR 1) for manufacturing the LCD of the second and third embodiments of the present invention.

First, as shown in FIG. 12, on the first transparent substrate 128 is formed a gate electrode metal layer (not shown) and at a specified region on the gate electrode metal layer is formed a gate electrode 104 by a known lithography technology using a first mask.

Figure 13:
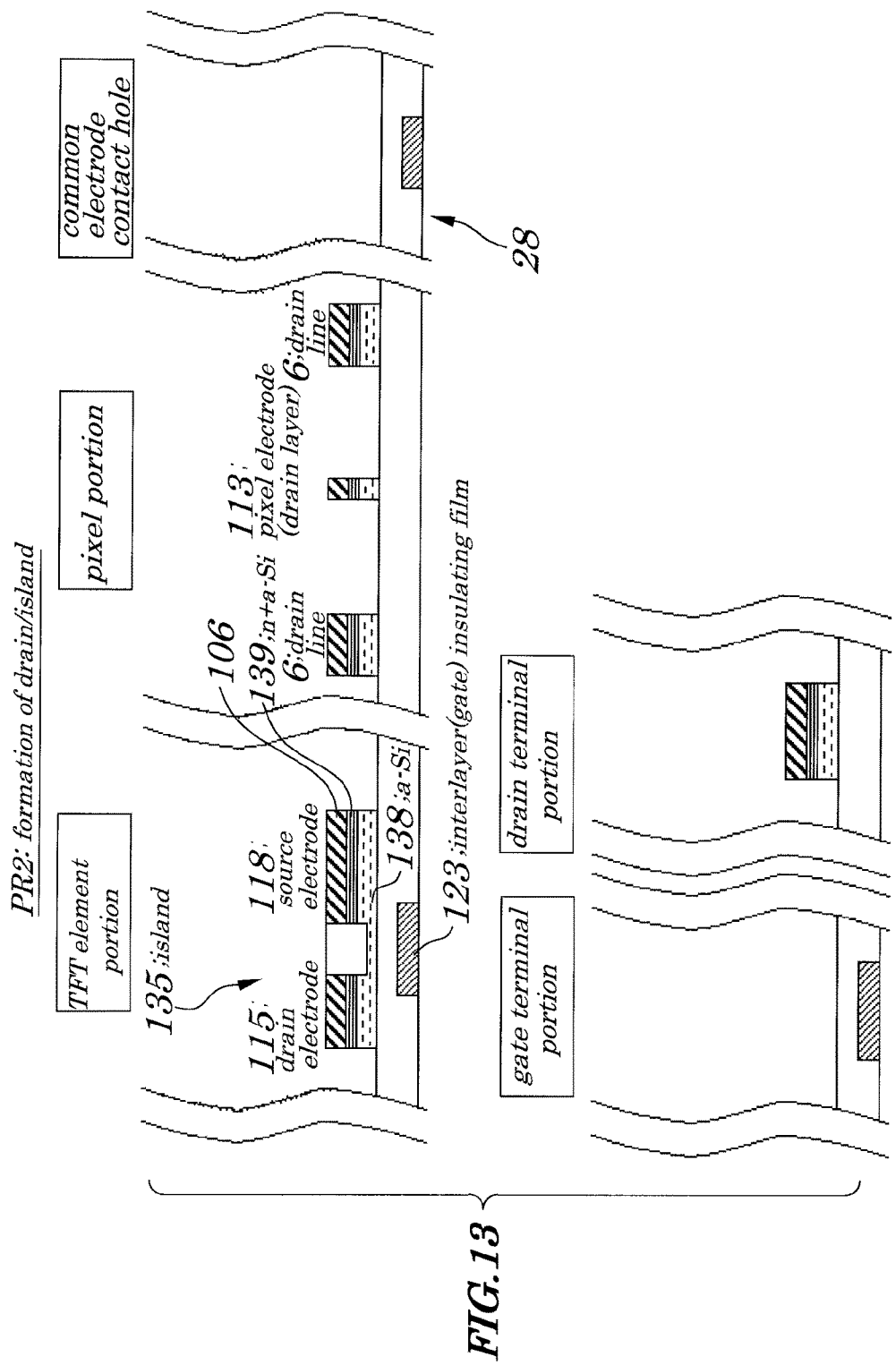
FIG. 13 is a cross-sectional view showing a second photo resist process (PR 2) for manufacturing the LCD of the second and third embodiments of the present invention.

Next, as shown in FIG. 13, on the first transparent substrate 128 are sequentially formed an interlayer insulating film 123, a⁻Si layer 138, the n⁺ a⁻Si layer 139, and a drain electrode metal layer and, by using a second mask, unwanted portions of the a⁻Si layer 138, n⁺ a⁻Si layer 139, and the drain electrode metal layer are removed to form the pixel electrode (drain layer) 113, the drain line 106 and the drain electrode 115 and an island 135.

Figure 14:
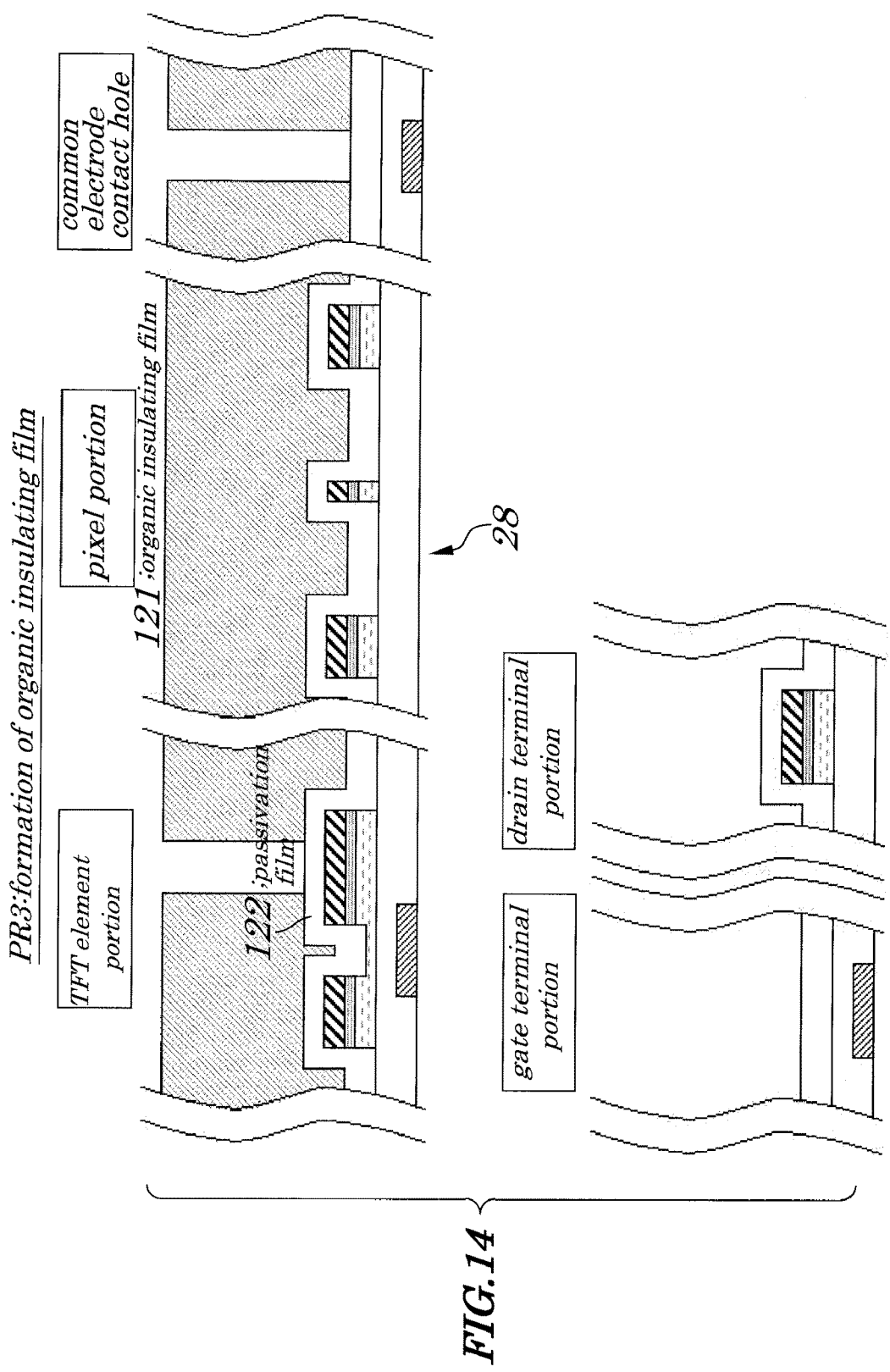
FIG. 14 is a cross-sectional view showing a third photo resist process (PR 3) for manufacturing the LCD of the second and third embodiments of the present invention.

Then, as shown in FIGS. 13 and 14, on the transparent insulating substrate 28 are sequentially formed a passivation film 122 and an organic insulating film 121 and, by using a third mask, an aperture which passes through the organic insulating film 121 is formed at a specified position on the passivation film 122 to provide a connection to a source electrode 118 of the island 135.

Figure 15:
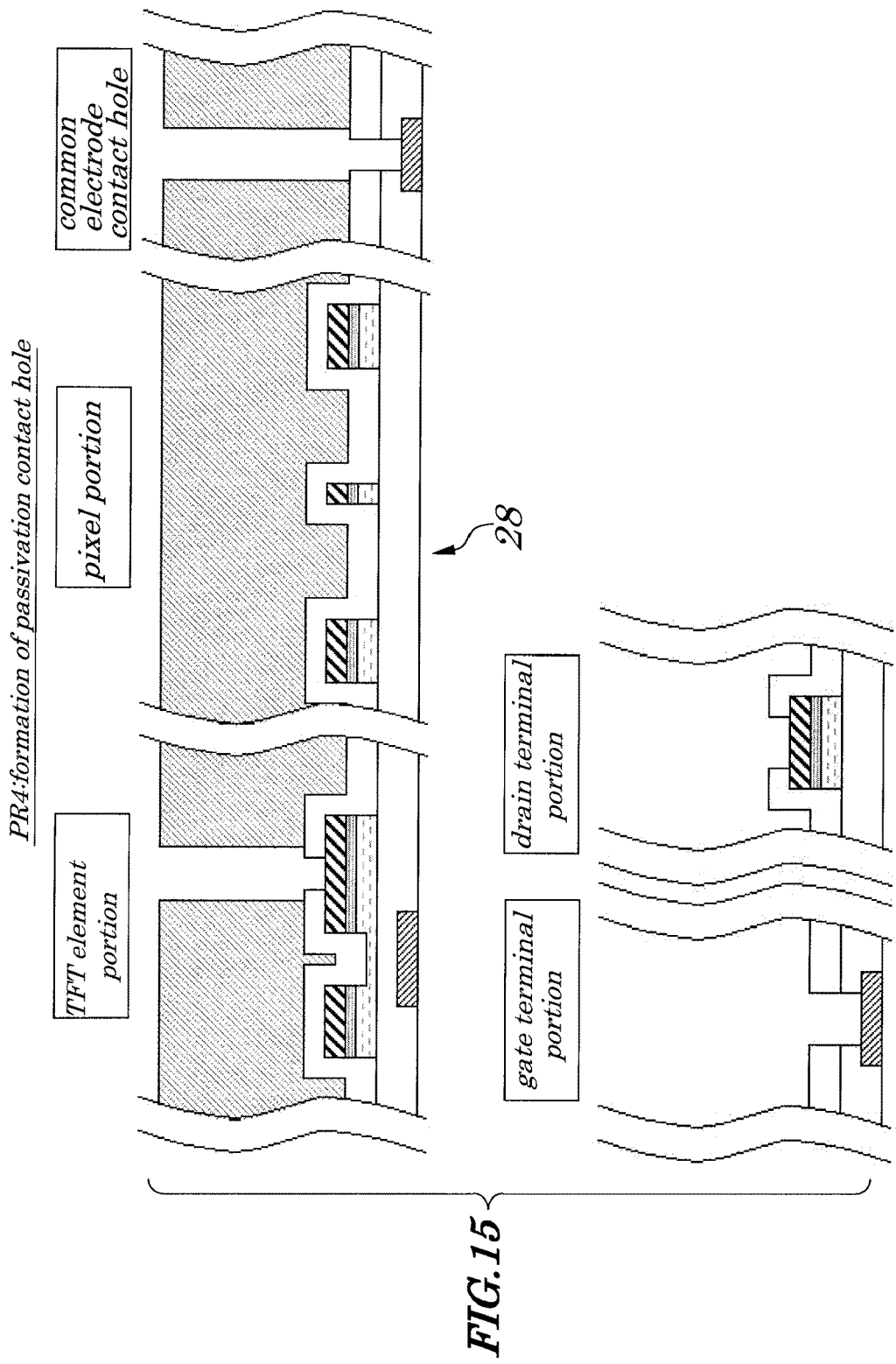
FIG. 15 is a cross-sectional view showing a fourth photo resist process (PR 4) for manufacturing the LCD of the second and third embodiments of the present invention.

Then, as shown in FIG. 15, a portion of the passivation film 122 being exposed on an aperture used to provide a connection to the source electrode 118 is removed by using a fourth mask to form a passivation contact.

Figure 16:
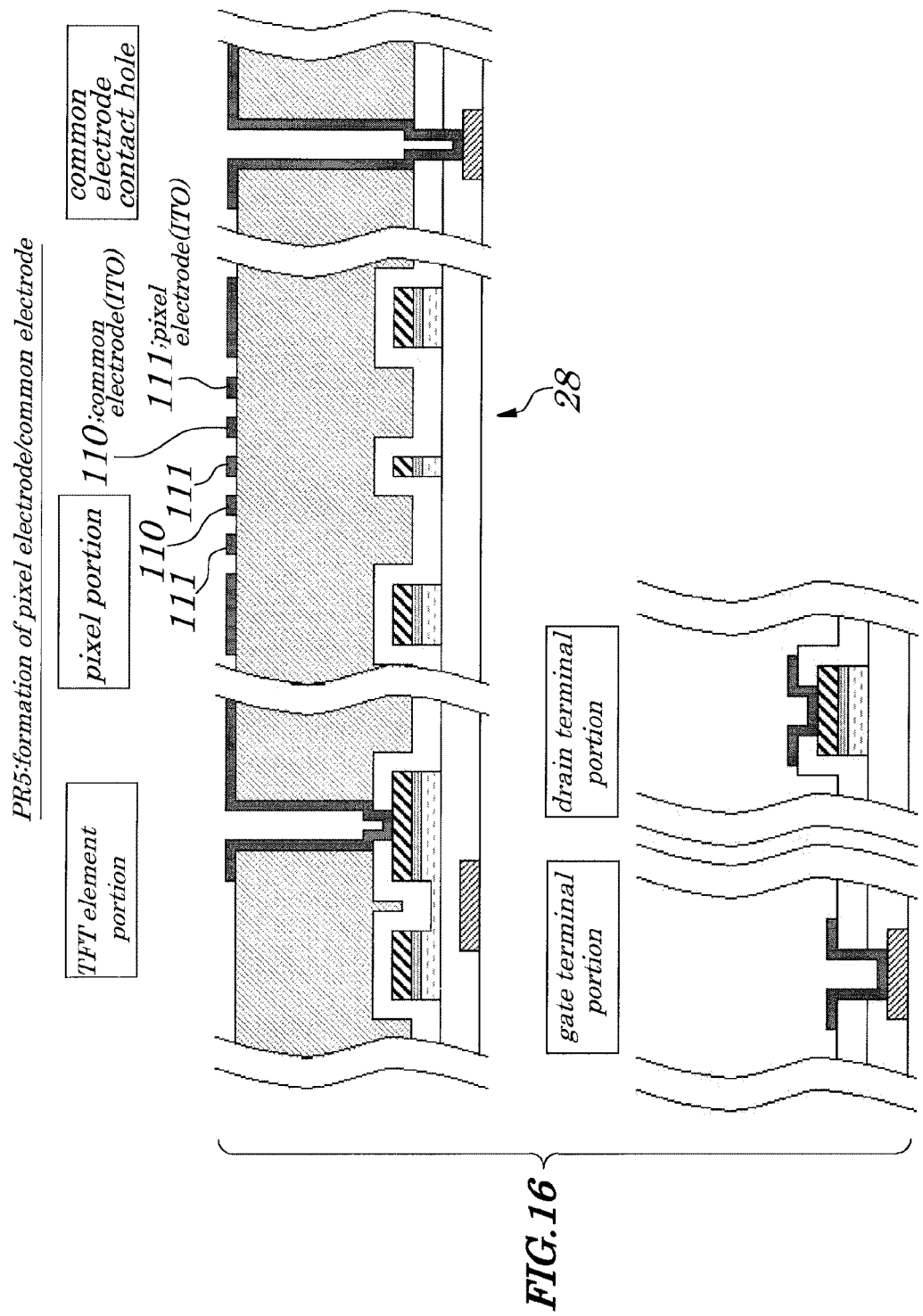
FIG. 16 is a cross-sectional view showing a fifth photo resist process (PR 5) for manufacturing the LCD of the second and third embodiments of the present invention.

Next, as shown in FIG. 16, on the transparent insulating substrate 28 an ITO film is formed, which becomes a pixel electrode 111, and an unwanted portion of the ITO film is removed by using a fifth mask to provide a connection between the source electrode 118 and the pixel electrode 111.

Figure 17:
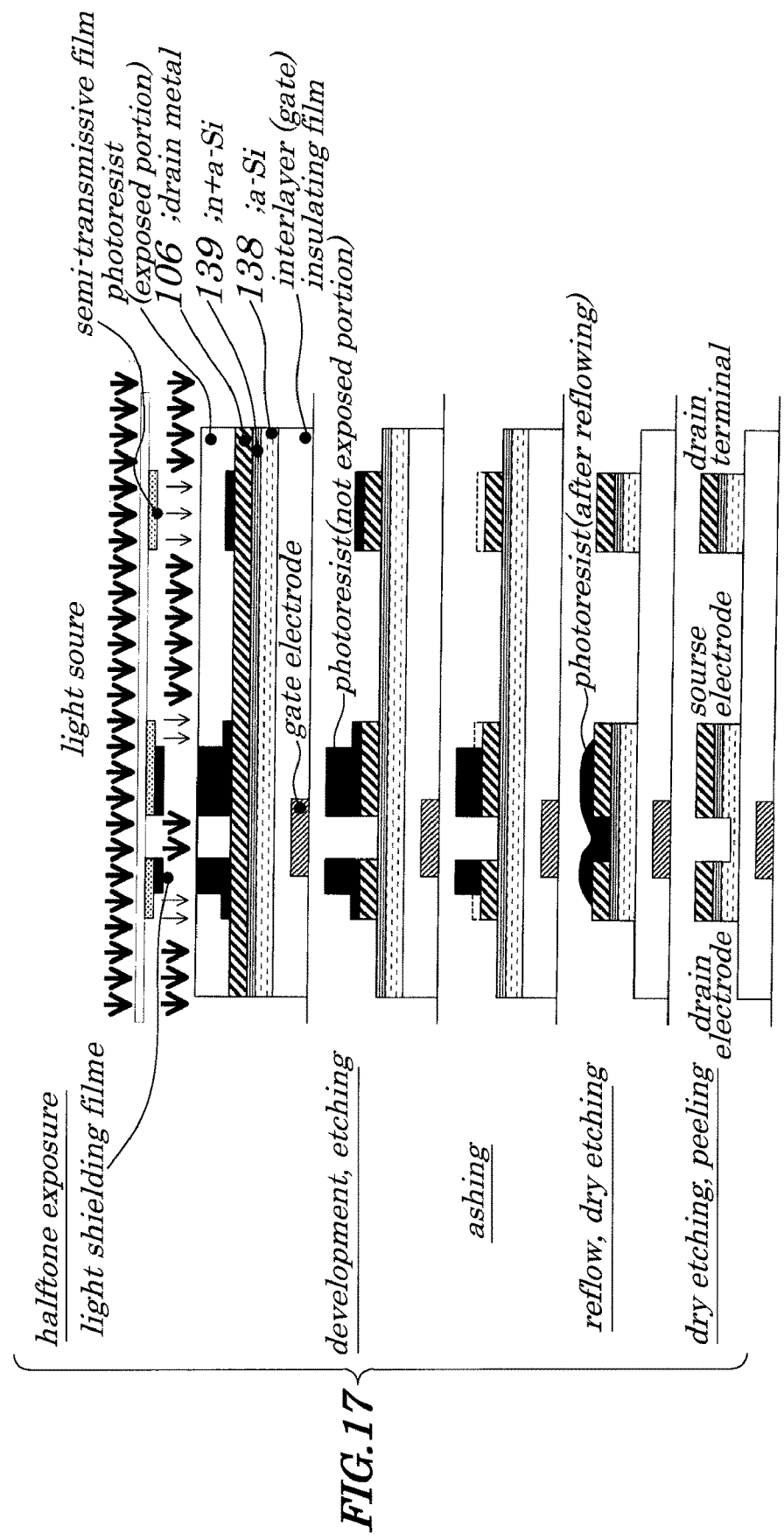
FIG. 17 is a cross-sectional view explaining, in detail, the second photo resist process (PR 2) for manufacturing the LCD of the second embodiment of the present invention.

In the second embodiment, instead of the second photo resist process (PR 2) described in FIG. 13, as shown in FIG. 17, an unwanted portion of the drain electrode metal layer 106 is removed by halftone exposure and, after performing ashing processing on a portion being not exposed and then performing reflow processing, a part of the n⁺ a⁻Si layer 139 and a part of the a⁻Si layer 138 are removed, and then a second mask being left, after the reflow processing, is peeled to form the island 135.

Figure 18:
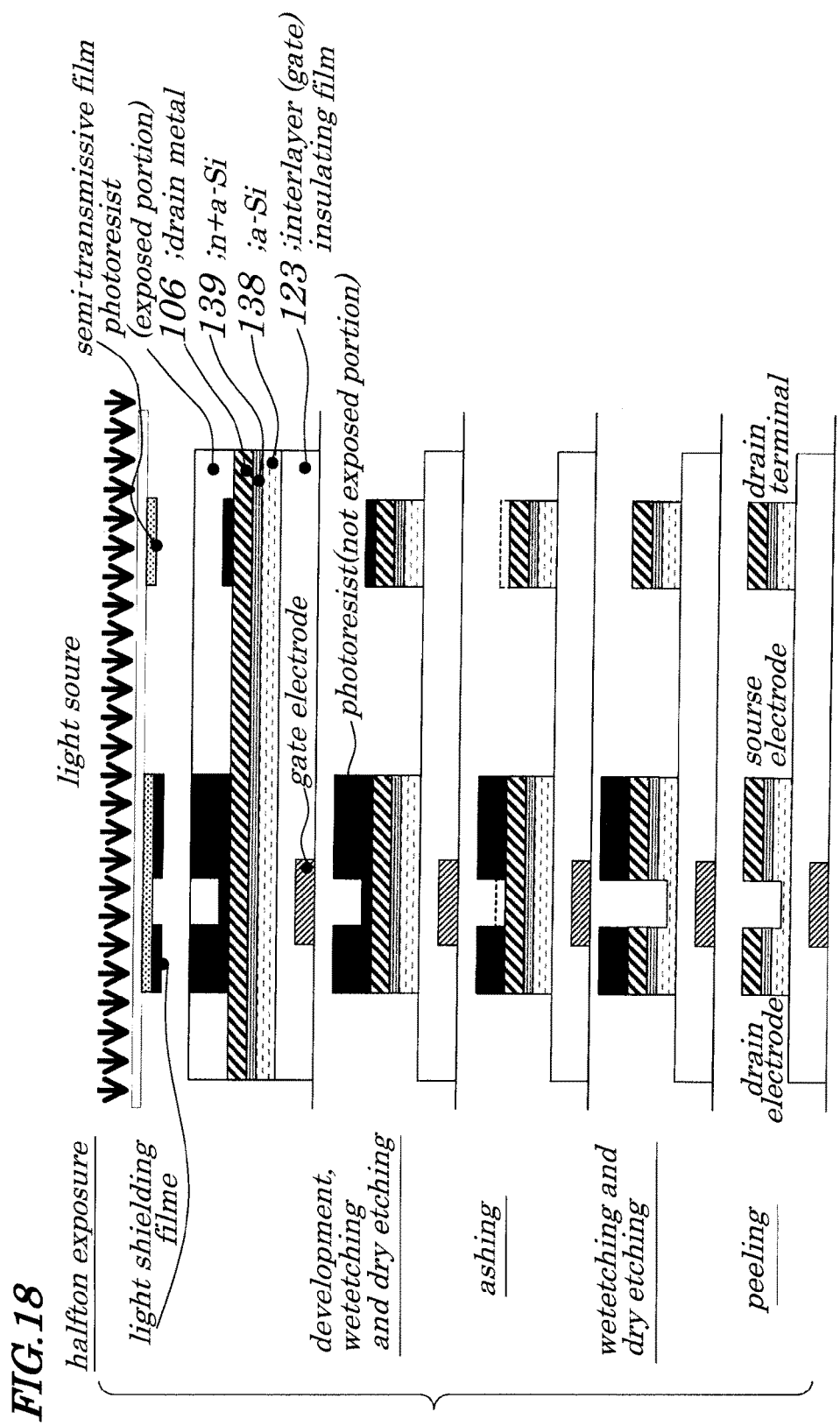
FIG. 18 is a cross-sectional view explaining, further in detail, a second photo resist process (PR 2) for manufacturing the LCD of the third embodiment of the present invention.

In the third embodiment, instead of the second photo resist process (PR 2) described in FIG. 13, as shown in FIG. 18, on the above transparent insulating substrate 28 are sequentially formed an interlayer insulating film 123, an a⁻Si layer 138, an n⁺ a⁻Si layer 139, and the drain electrode metal layer 106. By using the second mask, halftone exposure is performed to remove unwanted portions of the above the a⁻Si layer 138, n⁺ a⁻Si layer 139, and the drain electrode metal layer 106. After performing ashing processing on portions of the photo resist not exposed, a specified part of the above a⁻Si layer 138, the n⁺ a⁻Si layer 139, and the above drain electrode metal layer 106 are removed. Then, by peeling off portions that are not exposed, the island 135 is formed.

Thus, according to the method for manufacturing the LCD providing a wide viewing angle of the second and third embodiments, by using only five masks, the gate electrode 104, drain electrode 115, and pixel electrode 111 can be separated from each other using insulating films from each other and a channel protection-type active matrix substrate in which a surface and side walls of the a⁻Si layer 138 and n⁺ a⁻Si layer 139 is covered completely by the interlayer insulating film 123 and by the passivation film 122 can be formed.

Therefore, the manufacturing processes can be simplified at least by one photo resist process compared with the conventional method.

Fourth Embodiment

A method for manufacturing an LCD providing a wide viewing angle of a fourth embodiment will be described by referring to FIG. 4 to FIG. 9 and FIG. 11 to FIG. 18. In the fourth embodiment, unlike in the case of the first to third embodiments, formation of an organic insulating contact and a passivation contact is performed in a same process and therefore the manufacturing of the LCD can be simplified further by one photo resist process compared with the first to third embodiments.

That is, in the fourth embodiment, as a modification of the first embodiment shown in FIGS. 4 to 9, on a transparent insulating substrate are sequentially formed a gate electrode metal layer (not shown), a gate insulator (not shown), and an a⁻Si layer. Then, by using a first mask, a gate electrode 32, a gate insulating film 33 and an a⁻Si semiconductor layer 34 are formed. Next, on the transparent insulating substrate, an interlayer insulating film 23 and a drain electrode metal layer are sequentially formed. Then, by using a second mask, a drain line 6 is formed by removing the drain electrode metal layer 106 at a specified region. Then, on the transparent insulating substrate a passivation film 22 and an organic insulating film 21 are sequentially formed. By using a third mask, aperture portions 36 and 37 and an aperture on the drain line 6, which pierce through the organic insulating film 21, provide a connection to a source electrode 18/drain electrode 15 at a specified position on the passivation film 22. At the same time, the passivation contact is formed by removing a portion of the passivation film 22 being exposed at the aperture portions 36 and 37 used to provide a connection to the source electrode 18/drain electrode 15 and a portion of the passivation film 22 being exposed in the aperture portions on the drain line 6 in the TFT element portions. Next, on the transparent insulating substrate 28 is formed an ITO film which becomes a pixel electrode and then, by using a fourth mask, unwanted portions of the ITO film are removed to provide a connection between the source electrode 18 and the pixel electrode 11 and to provide a connection between the drain electrode 15 and the drain line 6.

Moreover, in the fourth embodiment, as a modification of the second embodiment, on the transparent insulating substrate 28 a gate electrode metal layer (not shown) is formed. By using a first mask, a gate electrode 104 is formed. And, on the transparent insulating substrate 28 an interlayer insulating film 123, an a⁻Si layer 138, an n⁺ a⁻Si layer 139, and a drain electrode metal layer 106 are sequentially formed. Then, by using a second mask, an unwanted portion of the drain electrode metal layer is removed by halftone exposure. After an ashing process is performed on a portion of the second mask being not exposed and, after a reflow process, a part of the n⁺a⁻Si layer 139 and the a⁻Si layer 138 are removed. Then, the second mask having undergone the reflow process is peeled off to form an island 135. Then, on the transparent insulating substrate 28 a passivation film 122 and an organic insulating film 121 are sequentially formed. By using a third mask, an aperture portion used to provide a connection to a source electrode 118 of an island 135 which passes through the organic insulating film 121 is formed at a specified position on the passivation film 122. At the same time, a portion of the passivation film 122 being exposed at the aperture portion used to provide a connection to the source electrode 118 is removed to provide a connection to the source electrode 118 and a passivation contact is formed. Then, on the transparent insulating substrate 28 an ITO film which becomes a pixel electrode 111 is formed. Then, by using a fourth mask, an unwanted portion of the ITO film is removed to connect the source electrode 118 to the pixel electrode 111.

Furthermore, in the fourth embodiment, as a modification of the third embodiment, as shown in FIGS. 11 to 18, on a first transparent insulating substrate 128 a gate electrode metal layer (not shown) is formed. By using a first mask, the gate electrode 104 is formed. Then, on the first transparent insulating substrate 128, an interlayer insulating film 123, an a⁻Si layer 138, an n⁺a⁻Si layer 139, and a drain electrode metal layer are sequentially formed. By using a second mask, unwanted portions of the a⁻Si layer 138, n⁺ a⁻Si layer 139, and drain electrode metal layer are removed using a halftone exposure method. After the ashing process is performed on a portion of the second mask being not exposed, a specified part of the a⁻ Si layer 138, n⁺a⁻Si layer 139, drain electrode metal layer are removed and then portions not exposed are removed to form the drain line 106 and the drain electrode 115 and an island 135. Next, on the first transparent insulating substrate 128 a passivation film 122 and an organic insulating film 121 are sequentially formed. By using a third mask, an aperture portion used to provide a connection to a source electrode 118 of the island 135, which passes through the organic insulating film 121, is formed at a specified position of the passivation film 122. At the same time, a part of the passivation film 122 being exposed at the aperture portion used to provide a connection to the source electrode 118 is removed to provide a connection to the source electrode 118 and a passivation contact is formed. Then, on the transparent insulating substrate 28 an ITO film which becomes an pixel electrode 111 is formed. By using a fifth mask, an unwanted portion of the ITO film is removed to connect the source electrode 118 to the pixel electrode 111.

In the above embodiments, the example is shown in which the organic insulating film is formed by a coating method. However, it may be formed by a printing method. In this case, a PR (photo resist) process for forming the organic insulating film is made unnecessary, which further shortens the processes for manufacturing the LCD.

Figure 19:
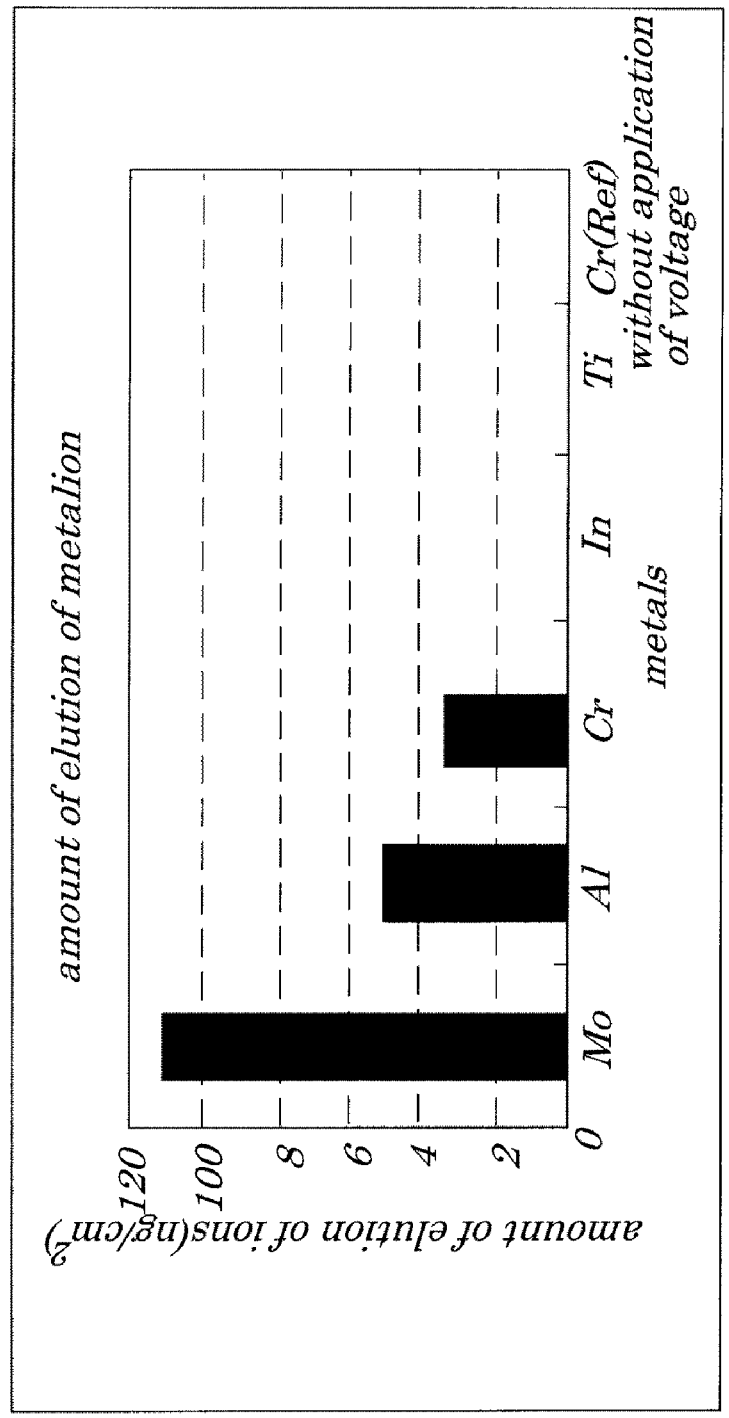
FIG. 19 is a graph showing an amount of elution of a metal ion in the LCD of the present invention.
Figure 20:
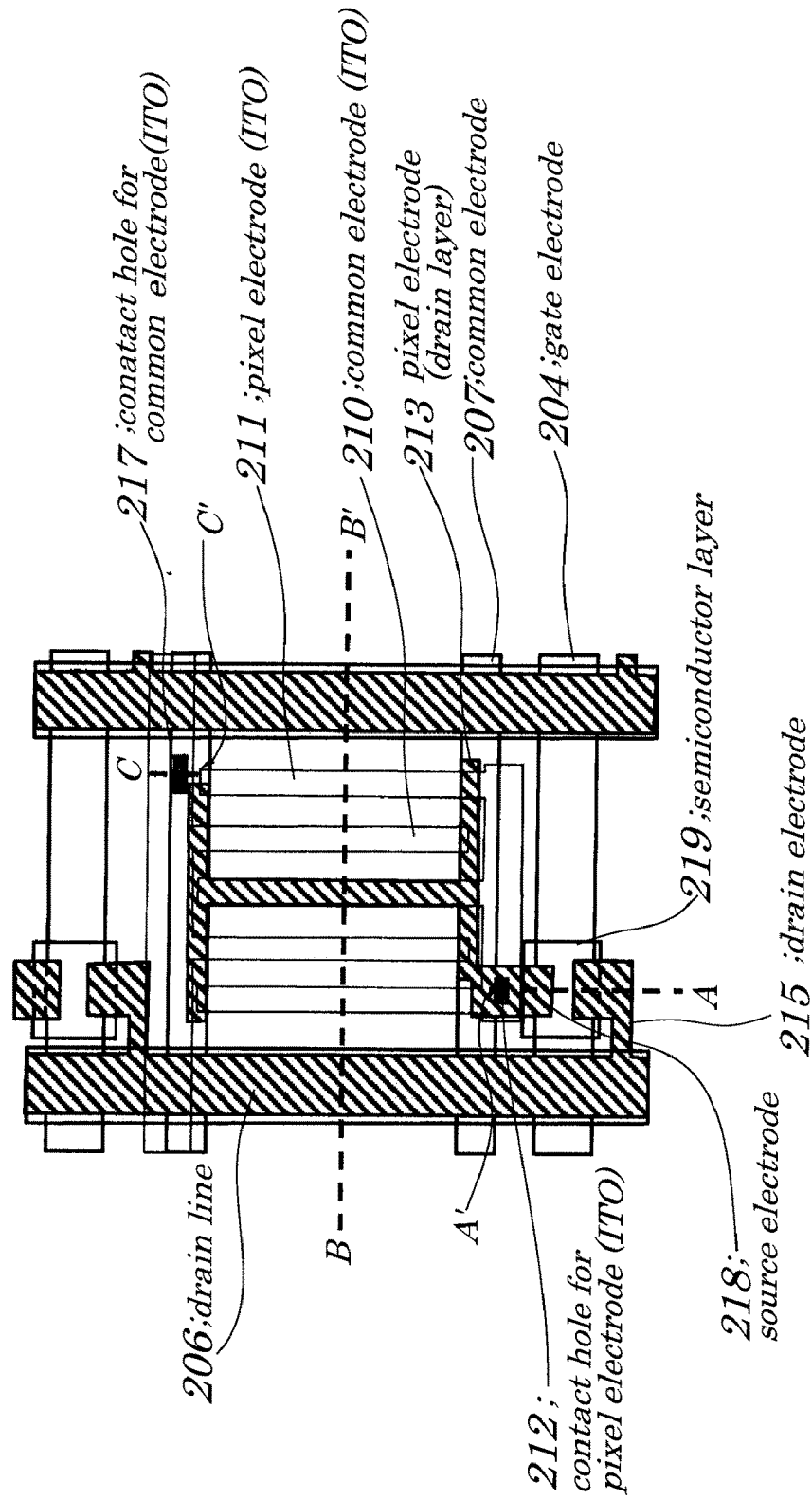
FIG. 20 is a plane view showing configurations of one pixel portion making up a conventional LCD providing a wide viewing angle.
Figure 21:
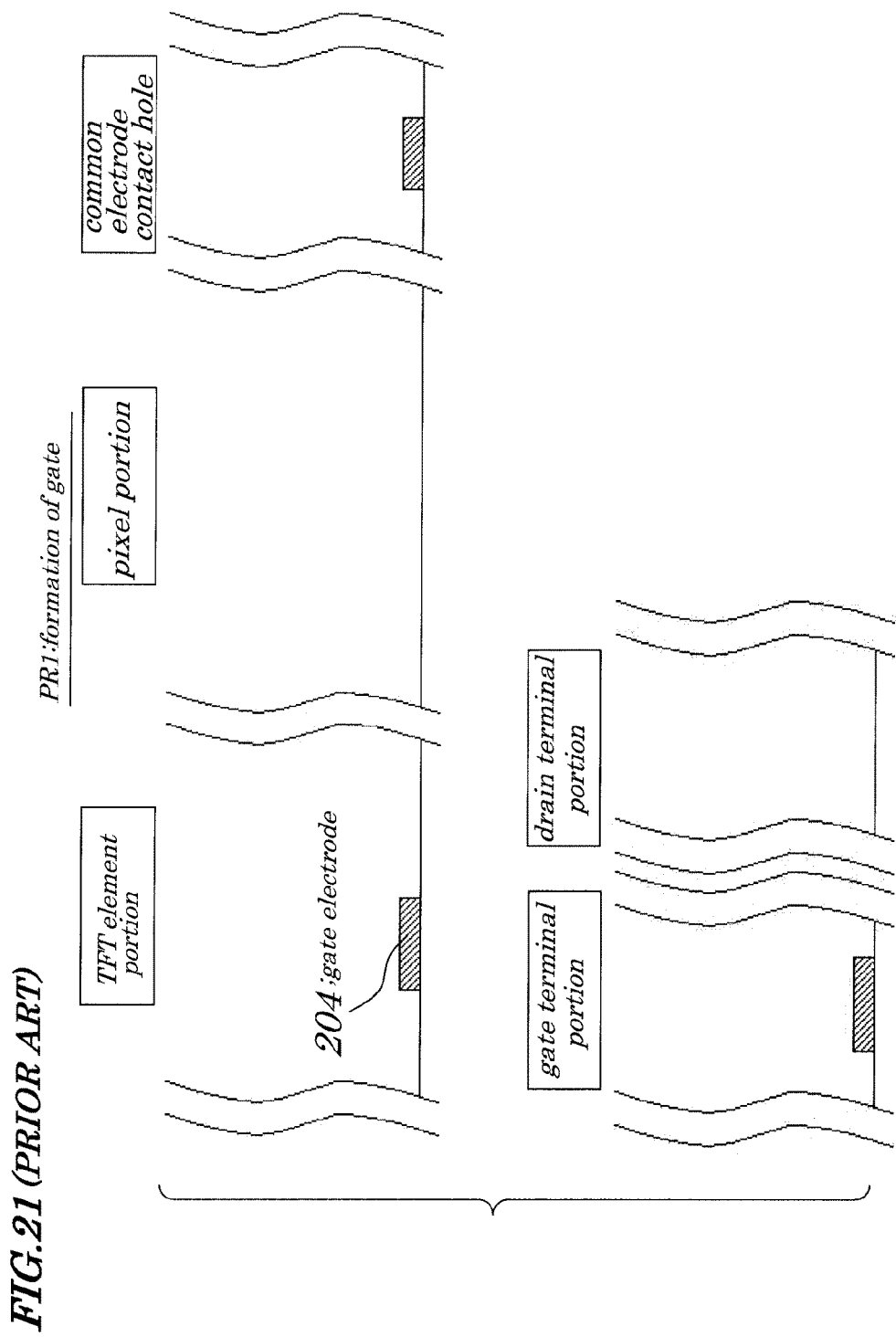
FIG. 21 is a cross-sectional view showing a first photo resist process (PR 1) for manufacturing the conventional LCD.
Figure 22:
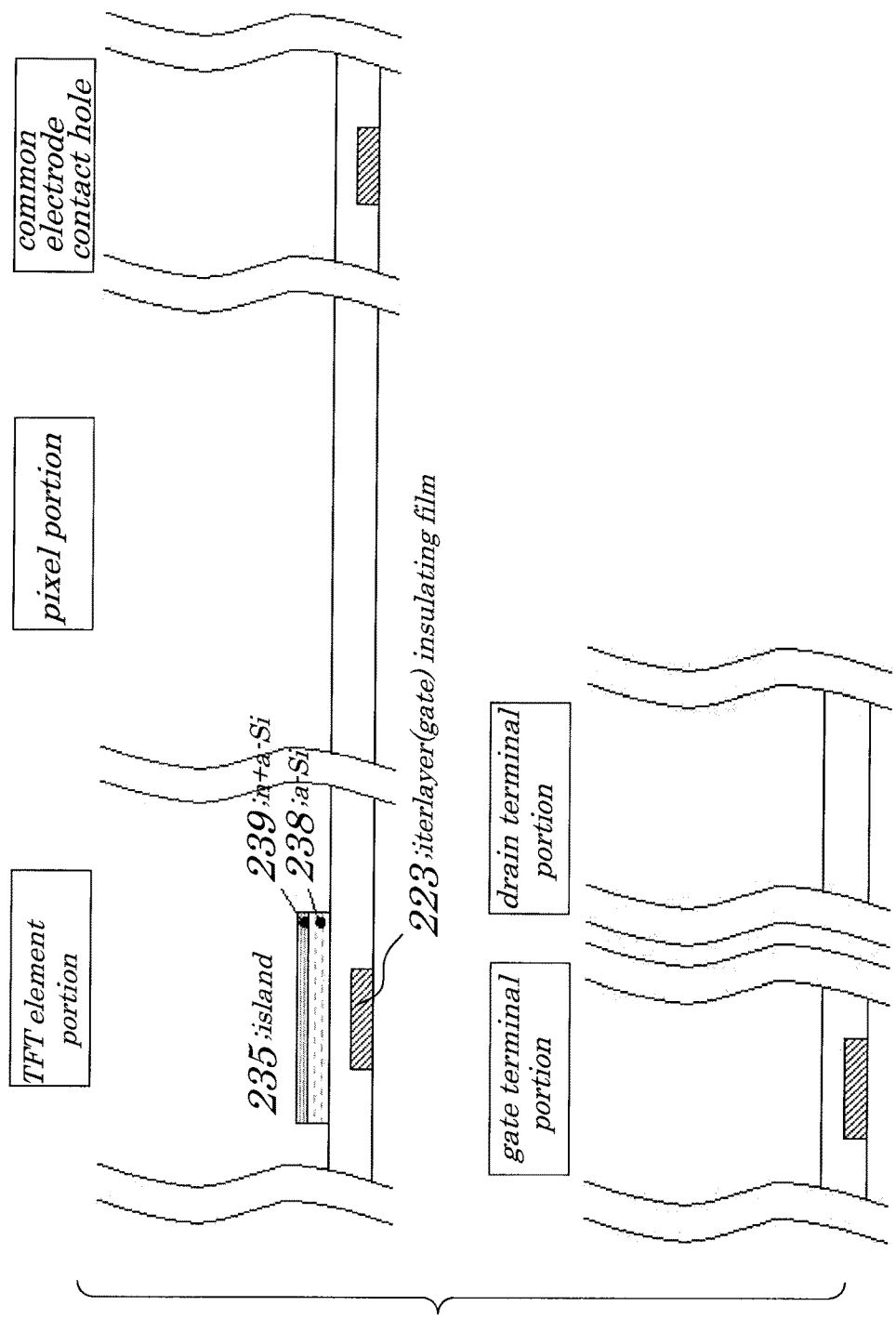
FIG. 22 is a cross-sectional view showing a second photo resist process (PR 2) for manufacturing the conventional LCD.
Figure 23:
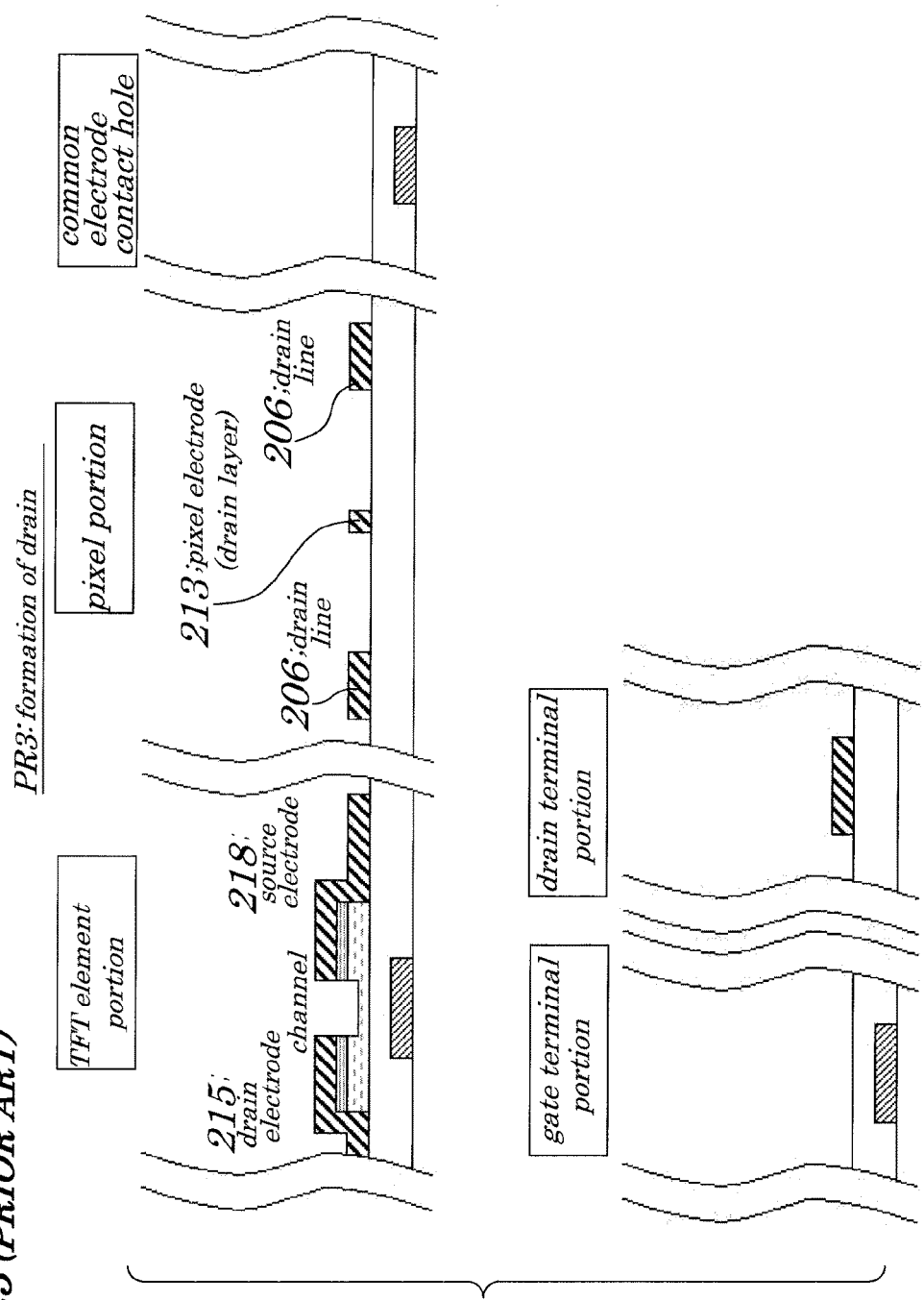
FIG. 23 is a cross-sectional view showing a third photo resist process (PR 3) for manufacturing the conventional LCD.
Figure 24:
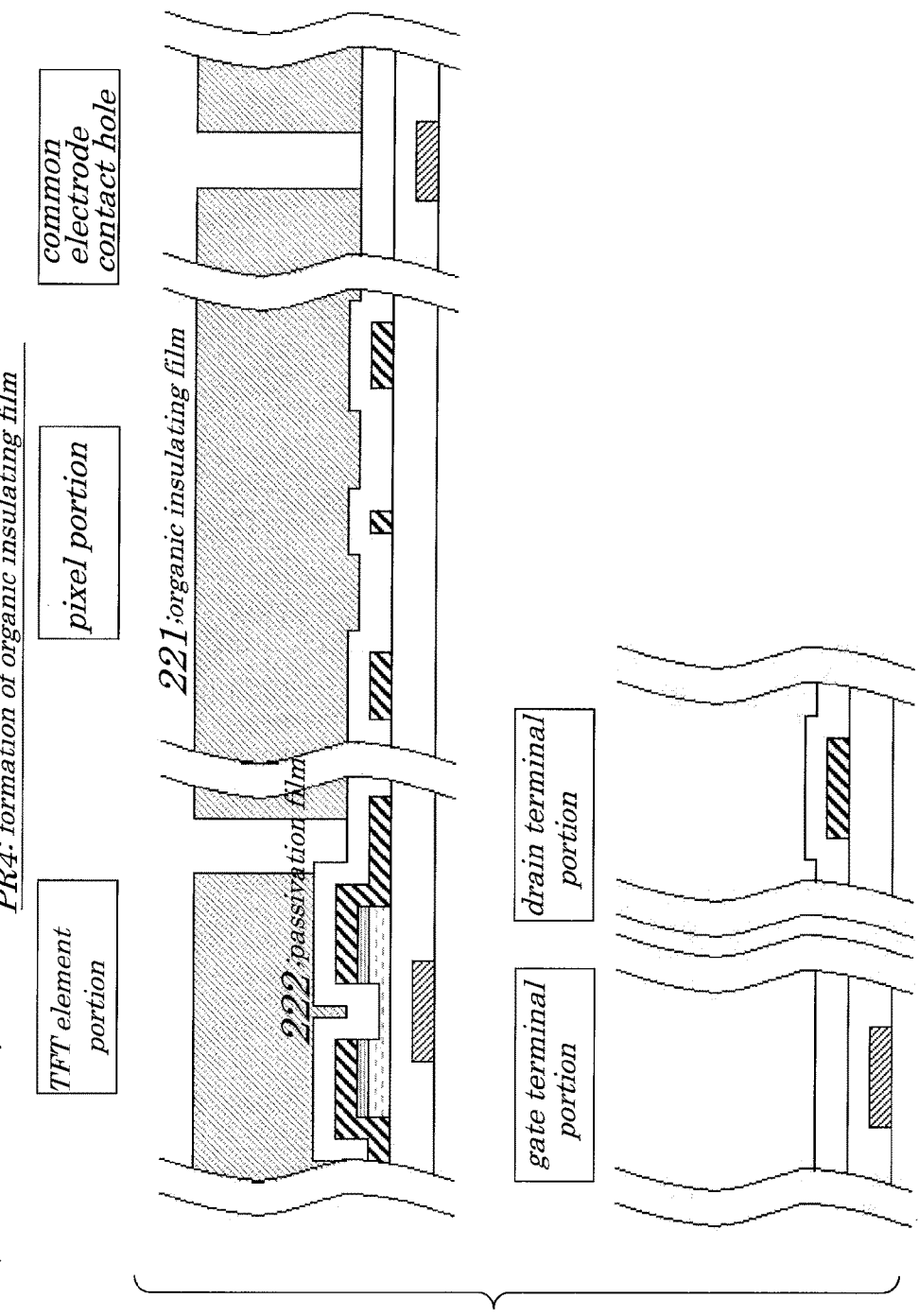
FIG. 24 is a cross-sectional view showing a fourth photo resist process (PR 4) for manufacturing the conventional LCD.
Figure 25:
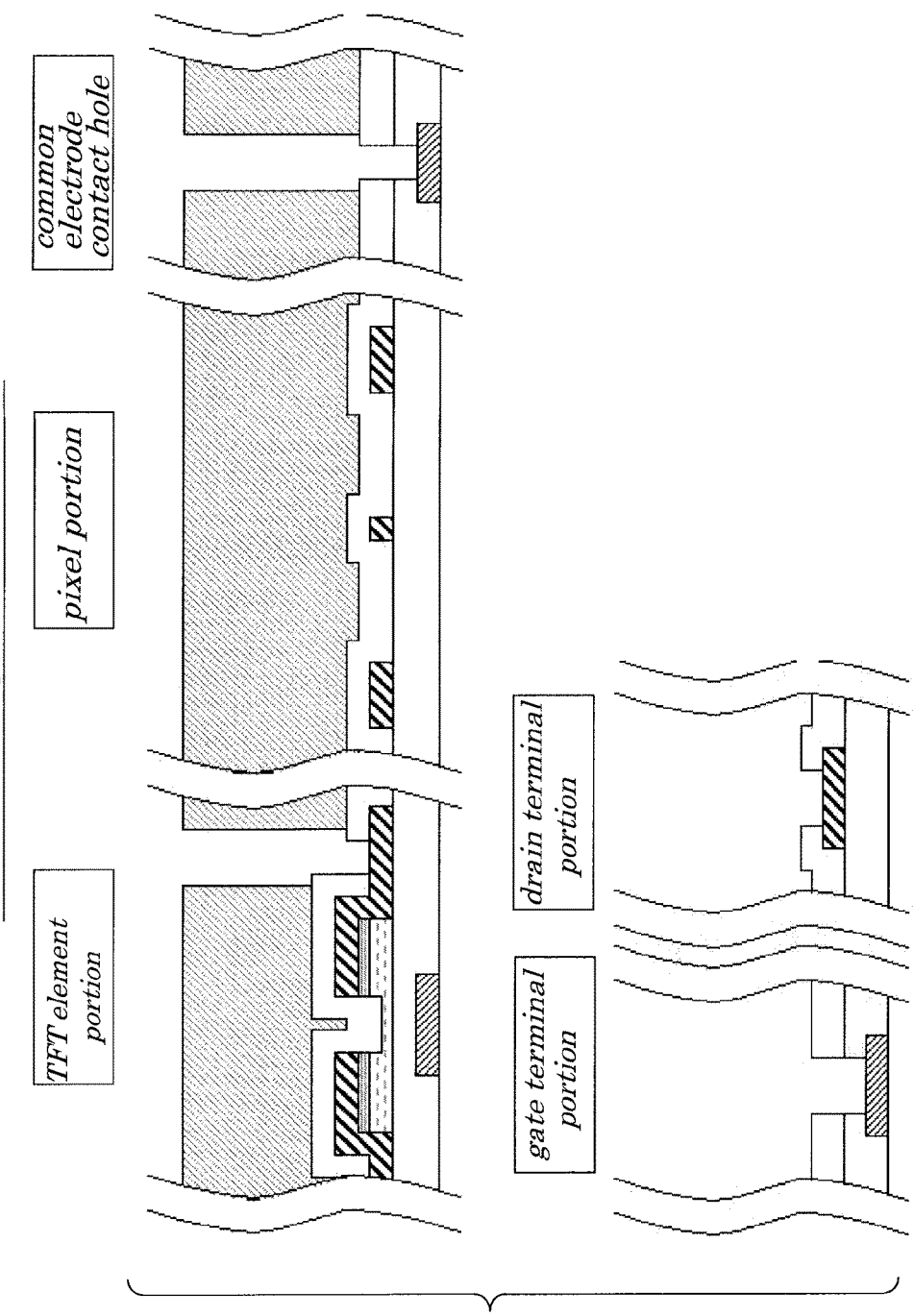
FIG. 25 is a cross-sectional view showing a fifth photo resist process (PR 5) for manufacturing the conventional LCD.
Figure 26:
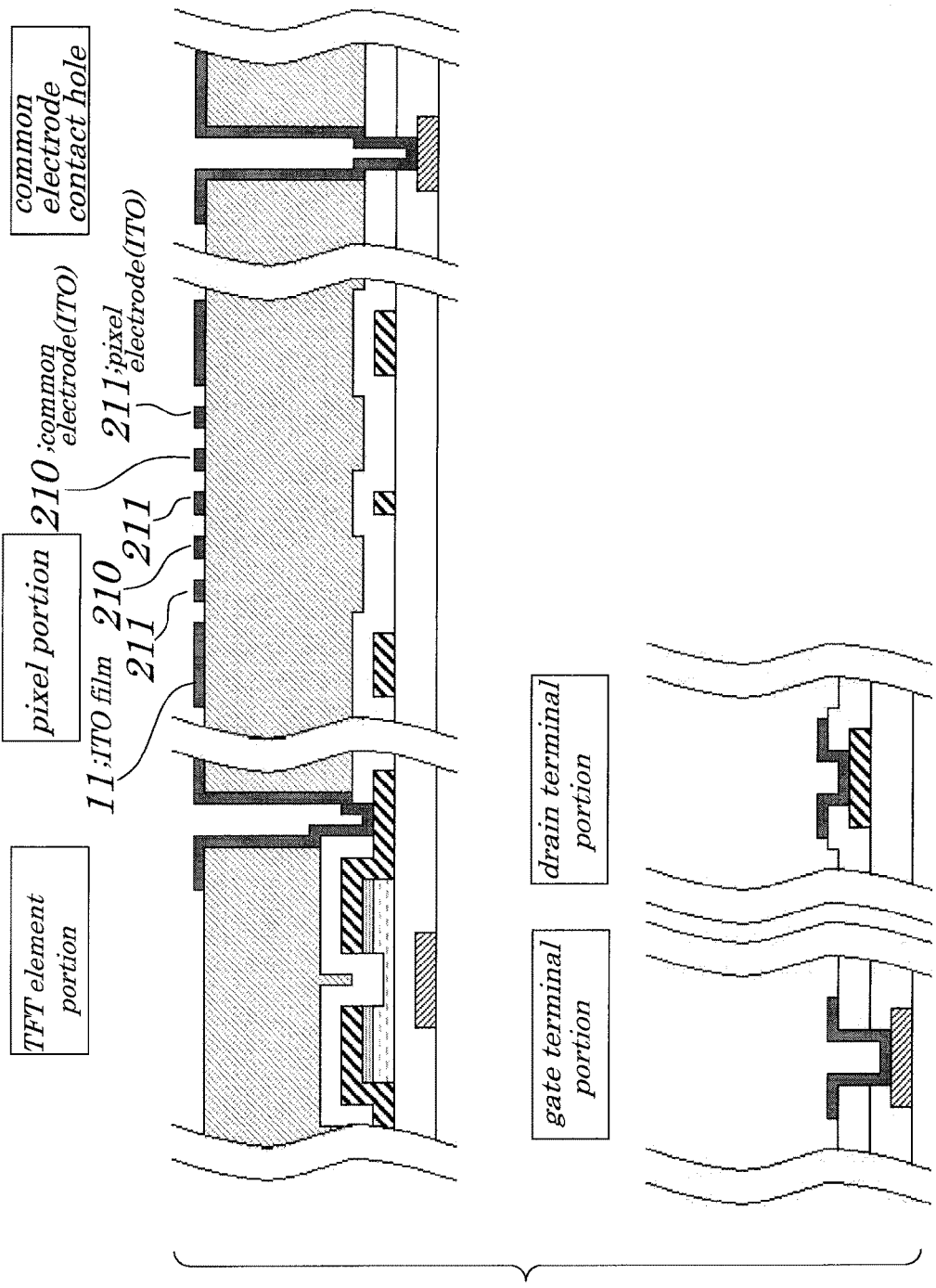
FIG. 26 is a cross-sectional view showing a sixth photo resist process (PR 6) for manufacturing the conventional LCD.

FIG. 19 is a graph showing an amount of elution of metal ions in the LCD of the present invention. This graph shows an amount of elution of metal ions into a liquid crystal obtained by continuously applying a stress to a panel for 729 hours, at 20V, and at 60° C. (as a reference, an amount of elution of Cr obtained by applying no voltage is shown). This indicates that the amount of elution of metal ions into the liquid crystal is large in the case of Cr and Mo which are metals having a high melting point and that the coverage by the protecting film is very important.

It is apparent that the present invention is not limited to the above embodiments but may be changed and modified without departing from the scope and spirit of the invention. For example, in the above embodiments, the LCD providing a wide viewing angle is described in which the display with a wide viewing angle is enabled by placing the common electrode and pixel electrode on the protecting film of the TFT and by rotating a direction of a liquid crystal molecule making up of a hermetically sealed manner in the liquid crystal layer on a surface being parallel to the surface of the active matrix substrate. However, the present invention can be applied to all the method for manufacturing LCDs.

Moreover, in the above embodiments, the island is made up a gate electrode, gate insulator, and semiconductor layer. However, the island may be configured by using other components.

Also, in the above embodiments, amorphous silicon (a⁻Si) is used as a material for the semiconductor layer. However, other materials may be also used.

Furthermore, in the above embodiments, SiN is used as a material for the passivation film. However, other materials may be employed as well.

What is claimed is:

1. A method for manufacturing a liquid crystal display providing a wide viewing angle in which a display with a wide viewing angle is enabled by placing a common electrode and a pixel electrode on a protecting film of a thin film transistor and by rotating a direction of a molecular axis of a liquid crystal molecule making up of a liquid crystal layer in a hermetically sealed manner on a surface being parallel to a surface of an active matrix substrate, said method comprising the steps of forming a gate electrode metal layer on a transparent insulating substrate and forming a gate electrode by patterning using photolithography;

sequentially forming an interlayer insulating film, an a–Si layer (amorphous silicon), an n+ a–Si (high concentration n-type amorphous silicon) layer, and a drain electrode metal layer on said transparent insulating substrate and forming a drain line and an island by performing patterning using photolithography employing a photo resist having a plurality of regions each having a different thickness, removing an unwanted portion of said drain electrode metal layer, and then ashing processing on portions being not exposed and performing reflow processing, and then removing a part of said $n^+$ $a^-Si$ layer and part of said a–Si layer, and then peeling said photo resist having undergone said reflow processing;

forming an insulating film on said transparent insulating substrate and forming an insulating film contact hole which passes through said insulating film and is used to provide a connection to a source electrode of said island at a specified position by patterning using photolithography; and forming a transparent conductive film which becomes a pixel electrode on said transparent insulating substrate and forming said pixel electrode and said common electrode by removing unwanted portions of said transparent conductive film by patterning using photolithography and of connecting said pixel electrode to said source electrode.

2. The method for manufacturing the liquid crystal display providing said wide viewing angle according to claim 1, wherein said insulating film is made up of an inorganic insulating film existing at a lower portion of said insulating layer and of an organic insulating film existing at a upper portion of said insulating layer and wherein, after an aperture portion is formed at a specified position of said organic insulating film existing at said upper portion of said insulating film by photolithography, etching is performed on said inorganic insulating film existing at said lower portion of said insulating film using said organic insulating film existing at said upper portion of said insulating film as a mask.

3. The method for manufacturing the liquid crystal display providing said wide viewing angle according to claim 1, wherein said gate electrode is a single layer made of a metal having a high melting point or is a two-layered film containing an upper layer made of a metal having a high melting point and a lower layer made of Al (aluminum) or an Al alloy.

4. The method for manufacturing the liquid crystal display providing said wide viewing angle according to claim 3, wherein said metal having a high melting point is Cr (chromium) or Mo (molybdenum).

5. The method for manufacturing the liquid crystal display providing said wide viewing angle according to claim 1, wherein each of said source electrode and said drain electrode is a single layer made of a metal having a high melting point or a two-layered film containing an upper layer made of a metal having a high melting point and a lower layer made of Al (aluminum) or an Al alloy, or a three-layered film containing an upper layer made of a metal having a high melting point, an intermediate layer made of Al (Aluminum) or an Al alloy and a lower layer made of a metal having a high melting point.

6. The method for manufacturing the liquid crystal display providing said wide viewing angle according to claim 5, wherein said metal having a high melting point is Cr (chromium) or Mo (molybdenum).

7. The method for manufacturing the liquid crystal display providing said wide viewing angle according to claim 1, wherein said insulating film is photosensitive.

8. A method for manufacturing a liquid crystal display providing a wide viewing angle in which a display with a wide viewing angle is enabled by placing a common electrode and a pixel electrode on a protecting film of a thin film transistor and by rotating a direction of a molecular axis of a liquid crystal molecule making up of a liquid crystal layer in a hermetically sealed manner on a surface being parallel to a surface of an active matrix substrate, said method comprising the steps of:

forming a gate electrode metal layer on a transparent insulating substrate and forming a gate electrode by patterning using photolithography;

sequentially forming an interlayer insulating film, an a–Si layer (amorphous silicon), an n+ a–Si layer (high concentration n-type amorphous silicon), and a drain electrode metal layer on said transparent insulating substrate and forming a drain line and an island by performing patterning employing photolithography using a photo resist having a plurality of regions each having a different thickness, removing unwanted portions of said drain electrode metal layer, and then ashing and reflow processing on portions being not exposed, and then removing a part of said $n^+$ a–Si layer and a part of said a–Si layer, and peeling said photo resist having undergone said reflow processing;

forming an insulating film on said transparent insulating substrate and forming an insulating film contact hole which passes through said insulating film and is used to provide a connection to a source electrode of said island at a specified position by a printing method; and forming an transparent conductive film which becomes said pixel electrode on said transparent insulating substrate and forming said pixel electrode and said common electrode by removing unwanted portions of said transparent conductive film by patterning using photolithography and of connecting said pixel electrode to said source electrode.

9. The method for manufacturing the liquid crystal display providing said wide viewing angle according to claim 8, wherein said insulating film is made up of an inorganic insulating film existing at a lower portion of said insulating layer and of an organic insulating film existing at a upper portion of said insulating layer and wherein, after an aperture portion is formed at a specified position of said organic insulating film existing at said upper portion of said insulating film by photolithography, etching is performed on said inorganic insulating film existing at said lower portion of said insulating film using said organic insulating film existing at said upper portion of said insulating film as a mask.

10. The method for manufacturing the liquid crystal display providing said wide viewing angle according to claim 8, wherein said gate electrode is a single layer made of a metal having a high melting point or is a two-layered film containing an upper layer made of a metal having a high melting point and a lower layer made of Al (aluminum) or an Al alloy.

11. The method for manufacturing the liquid crystal display providing said wide viewing angle according to claim 8, wherein each of said source electrode and said drain electrode is a single layer made of a metal having a high melting point or a two-layered film containing an upper layer made of a metal having a high melting point and a lower layer made of Al (aluminum) or an Al alloy, or a three-layered film containing an upper layer made of a metal having a high melting point, an intermediate layer made of Al (Aluminum) or an Al alloy and a lower layer made of a metal having a high melting point.

* * * * *